US012606116B2

(12) United States Patent
Stroebe et al.

(10) Patent No.: US 12,606,116 B2
(45) Date of Patent: Apr. 21, 2026

(54) COMPONENT FOR VEHICLE INTERIOR

(71) Applicant: Yanfeng International Automotive Technology Co. Ltd., Novi, MI (US)

(72) Inventors: Jennifer A. Stroebe, Holland, MI (US); Dale Todd Glynn, Allendale, MI (US)

(73) Assignee: Yanfeng International Automotive Technology Co. Ltd., Novi, MI (US)

( * ) Notice: Subject to any disclaimer, the term of this patent is extended or adjusted under 35 U.S.C. 154(b) by 0 days.

(21) Appl. No.: 19/171,163

(22) Filed: Apr. 4, 2025

(65) Prior Publication Data

US 2025/0229742 A1 Jul. 17, 2025

Related U.S. Application Data

(63) Continuation of application No. PCT/US2023/034407, filed on Oct. 3, 2023.
(Continued)

(51) Int. Cl.
*B60R 21/2165* (2011.01)
*B29C 37/00* (2006.01)
(Continued)

(52) U.S. Cl.
CPC ...... *B60R 21/2165* (2013.01); *B29C 37/0057* (2013.01); *B29C 43/18* (2013.01);
(Continued)

(58) Field of Classification Search
CPC .......... B60R 21/2165; B60R 21/21656; B60R 21/203; B60R 21/205; B60R 21/206;
(Continued)

(56) References Cited

U.S. PATENT DOCUMENTS 5,060,971 A * 10/1991 Nanbu .............. B60R 21/21656
280/728.3
5,172,932 A * 12/1992 Watanabe ......... B60R 21/21656
280/731
(Continued)

FOREIGN PATENT DOCUMENTS

AU 5392498 A * 8/1998
DE 19516230 A1 * 11/1996 ......... B60R 21/2165
(Continued)

OTHER PUBLICATIONS

Definition of Molded; https://www.thefreedictionary.com/molded; Sep. 8, 2025 (Year: 2025).*

*Primary Examiner* — Keith J Frisby
(74) *Attorney, Agent, or Firm* — Amin, Turocy & Watson, LLP

(57) ABSTRACT

A component for an interior of a vehicle configured to facilitate formation of an opening for deployment of an airbag into the interior of the vehicle is disclosed. The component may comprise a composite structure comprising a substrate and a cover; the substrate may comprise a base layer and a feature configured to facilitate formation of the opening; the base layer may comprise a fiber panel formed into a compressed fiber panel to provide a structural substrate; the feature may comprise a projection arrangement that may comprise a set of projections; the cover may comprise a set of cavities. The projection arrangement may comprise a tear line for formation of the opening. The compressed fiber panel may comprise a generally rigid fiber panel with a set of projections/nubs formed of a resin. The base layer may comprise a recess. The cover may comprise a substantially uniform exterior surface.

20 Claims, 25 Drawing Sheets

Related U.S. Application Data

(60) Provisional application No. 63/413,782, filed on Oct. 6, 2022.

(51) Int. Cl.

| | |
|---|---|
| *B29C 43/18* | (2006.01) |
| *B29C 43/20* | (2006.01) |
| *B29C 45/14* | (2006.01) |
| *B29C 45/16* | (2006.01) |
| *B32B 3/30* | (2006.01) |
| *B32B 5/02* | (2006.01) |
| *B32B 27/12* | (2006.01) |
| *B60R 13/02* | (2006.01) |
| *B60R 21/203* | (2006.01) |
| *B60R 21/205* | (2011.01) |
| *B60R 21/215* | (2011.01) |
| *B29L 31/30* | (2006.01) |

(52) U.S. Cl.
CPC ............ *B29C 43/203* (2013.01); *B29C 45/14* (2013.01); *B29C 45/14786* (2013.01); *B29C 45/14811* (2013.01); *B29C 45/16* (2013.01); *B29C 45/1676* (2013.01); *B32B 3/30* (2013.01); *B32B 5/02* (2013.01); *B32B 27/12* (2013.01); *B60R 13/02* (2013.01); *B60R 13/0256* (2013.01); *B60R 21/203* (2013.01); *B60R 21/215* (2013.01); *B60R 21/21656* (2013.01); *B29L 2031/3008* (2013.01); *B29L 2031/3038* (2013.01)

(58) Field of Classification Search
CPC ... B60R 21/215; B60R 21/2342; B60R 13/02; B60R 13/0256; B29L 2031/3038; B29L 2031/3008; B29C 59/007; B29C 37/0057; B29C 45/00; B29C 45/1418; B29C 45/14778; B29C 45/14786; B29C 45/14811; B29C 45/16; B29C 45/1676; B29C 45/14; B29C 43/18; B29C 43/184; B29C 43/20; B29C 43/203; B29C 41/22; Y10T 428/15; B32B 27/12; B32B 3/30; B32B 5/02
USPC ........ 280/728.3, 731, 732; 428/43, 137, 221
See application file for complete search history.

(56) References Cited

U.S. PATENT DOCUMENTS

| | | | | |
|---|---|---|---|---|
| 5,316,822 A * | 5/1994 | Nishijima | ........... | B60R 21/2165 428/218 |
| 5,390,950 A * | 2/1995 | Barnes | ................ | B60R 21/2165 280/732 |
| 5,431,434 A * | 7/1995 | Yamakawa | ......... | B29C 37/0057 280/728.1 |
| 5,478,106 A * | 12/1995 | Bauer | ................ | B60R 21/2165 280/732 |
| 5,501,890 A * | 3/1996 | Mills | ................... | B60R 21/2165 428/68 |
| 5,527,574 A * | 6/1996 | Iannazzi | ................ | B29C 41/20 428/43 |
| 5,839,752 A * | 11/1998 | Yamasaki | ............. | B29C 59/007 280/732 |
| 5,989,479 A * | 11/1999 | Yamasaki | ........... | B60R 21/2165 264/479 |
| 6,460,875 B1 * | 10/2002 | Teranishi | ............ | B60R 21/2165 280/732 |
| 7,425,018 B2 * | 9/2008 | Suwama | ............. | B29C 45/1671 280/732 |
| 9,010,800 B1 * | 4/2015 | Hunter | ................ | B29C 66/7392 280/728.3 |
| 2009/0309338 A1 * | 12/2009 | Hillman | .............. | B60R 21/2165 280/732 |
| 2015/0224955 A1 * | 8/2015 | Cowelchuk | ........... | B60R 21/215 280/728.3 |
| 2017/0050607 A1 * | 2/2017 | Toda | ................... | B60R 21/2165 |
| 2019/0118756 A1 * | 4/2019 | Sterne Stroebe | ... | B60R 13/0256 |
| 2020/0391421 A1 * | 12/2020 | Stroebe | .............. | B60R 13/0256 |
| 2021/0268969 A1 * | 9/2021 | Reddy | ................ | B29C 44/1228 |
| 2022/0153220 A1 * | 5/2022 | Stroebe | .............. | B60R 13/0256 |

FOREIGN PATENT DOCUMENTS

| | | | | | |
|---|---|---|---|---|---|
| DE | 19718931 | C1 * | 8/1998 | ....... | B60R 21/21656 |
| DE | 19581573 | C1 * | 12/1998 | ........ | B60R 21/2165 |
| EP | 791508 | A1 * | 8/1997 | | |
| JP | H05170044 | A * | 7/1993 | | |
| JP | H05294196 | A * | 11/1993 | | |
| JP | H08282332 | A * | 10/1996 | | |
| JP | H092180 | A * | 1/1997 | | |
| JP | H092189 | A * | 1/1997 | | |
| JP | H09315251 | A * | 12/1997 | | |
| JP | H1044909 | A * | 2/1998 | | |
| JP | H1059110 | A * | 3/1998 | | |
| JP | H10119687 | A * | 5/1998 | | |
| JP | H10203287 | A * | 8/1998 | ........ | B29C 45/1635 |
| JP | H10226301 | A * | 8/1998 | | |
| JP | 2001146143 | A * | 5/2001 | | |
| JP | 2002037000 | A * | 2/2002 | | |
| JP | 2002037001 | A * | 2/2002 | | |
| JP | 3298503 | B2 * | 7/2002 | ........ | B60R 21/2165 |
| JP | 2004352179 | A * | 12/2004 | | |
| JP | 2009083616 | A * | 4/2009 | | |
| JP | 2010076704 | A * | 4/2010 | | |
| JP | 2013047087 | A * | 3/2013 | | |
| KR | 20020057862 | A * | 7/2002 | .......... | B60R 21/205 |
| WO | WO-9119630 | A1 * | 12/1991 | ....... | B60R 21/21656 |
| WO | WO-9836948 | A1 * | 8/1998 | .......... | B29C 59/007 |
| WO | WO-2010009874 | A2 * | 1/2010 | ........ | B60R 21/2165 |
| WO | WO-2021213461 | A1 * | 10/2021 | ........ | B60R 21/2165 |

* cited by examiner

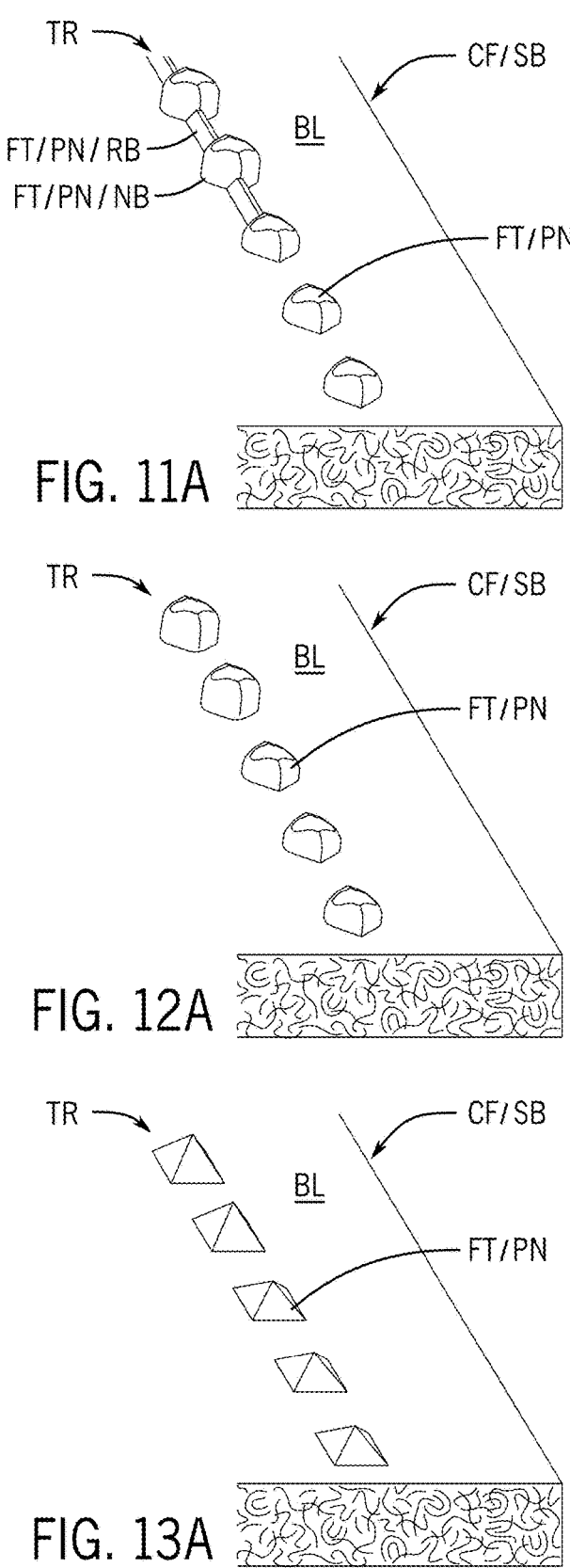
FIG. 11A
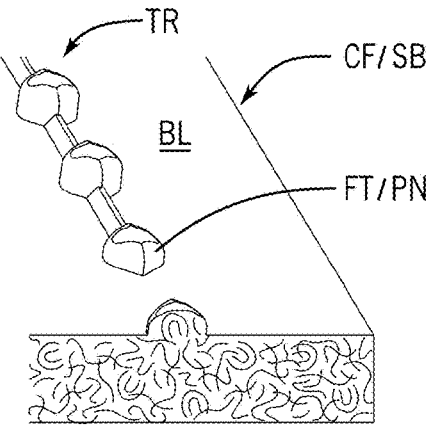
FIG. 11B
FIG. 12A
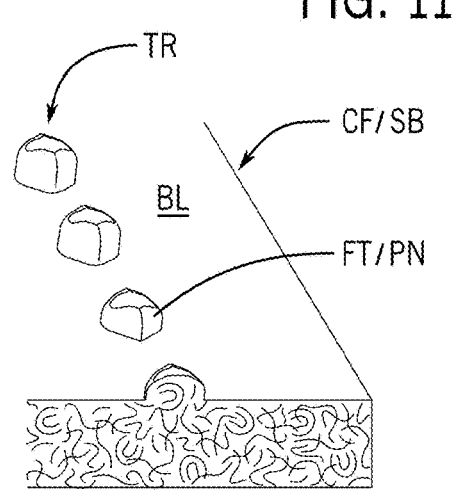
FIG. 12B
FIG. 13A
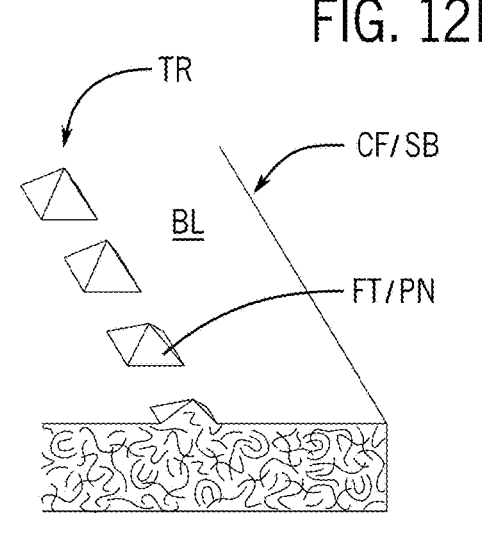
FIG. 13B

TR

FT/PN/RB

CF/SB

BL

TR

CF/SB

BL

FT/PN/RB

TR

CF/SB

BL

FT/PN/RB $t_M$

FM $t_P$

PF

VN

PF

MT

MB

CF/SB

FT

FT

CF/SB

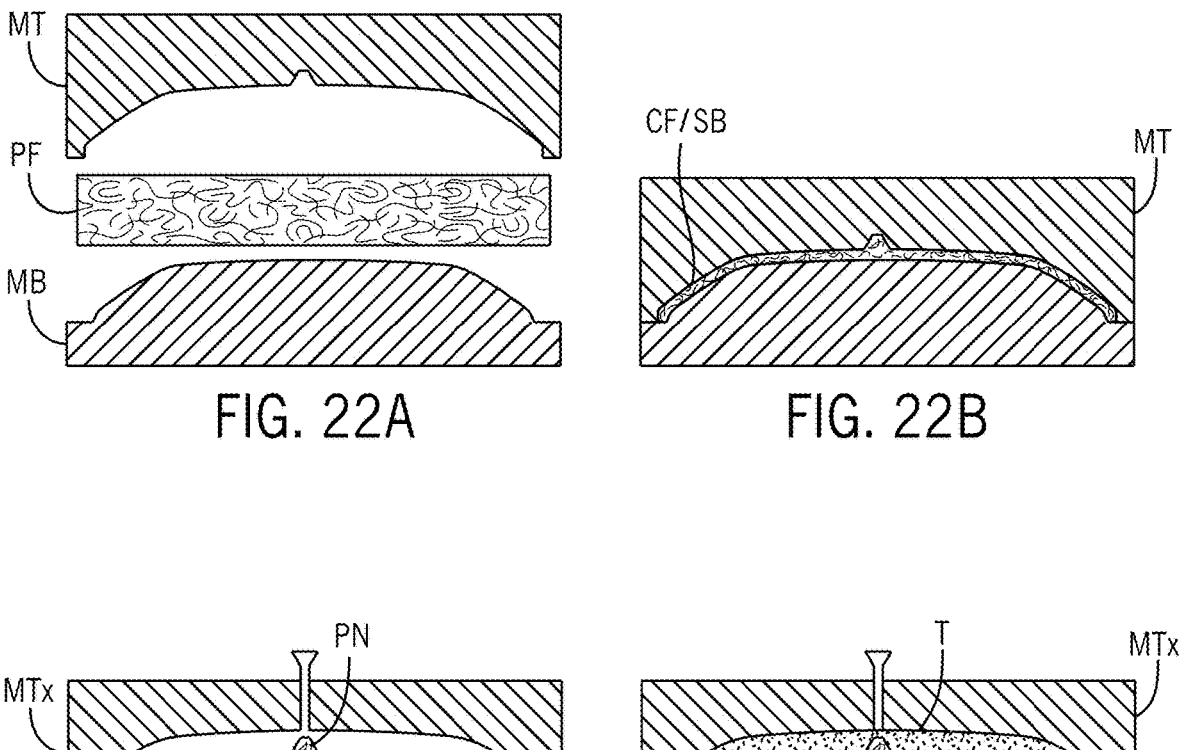
FIG. 22A          FIG. 22B
FIG. 22C          FIG. 22D
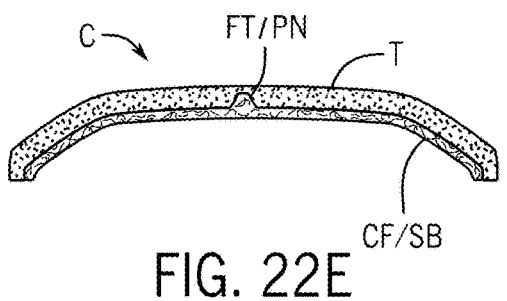
FIG. 22E

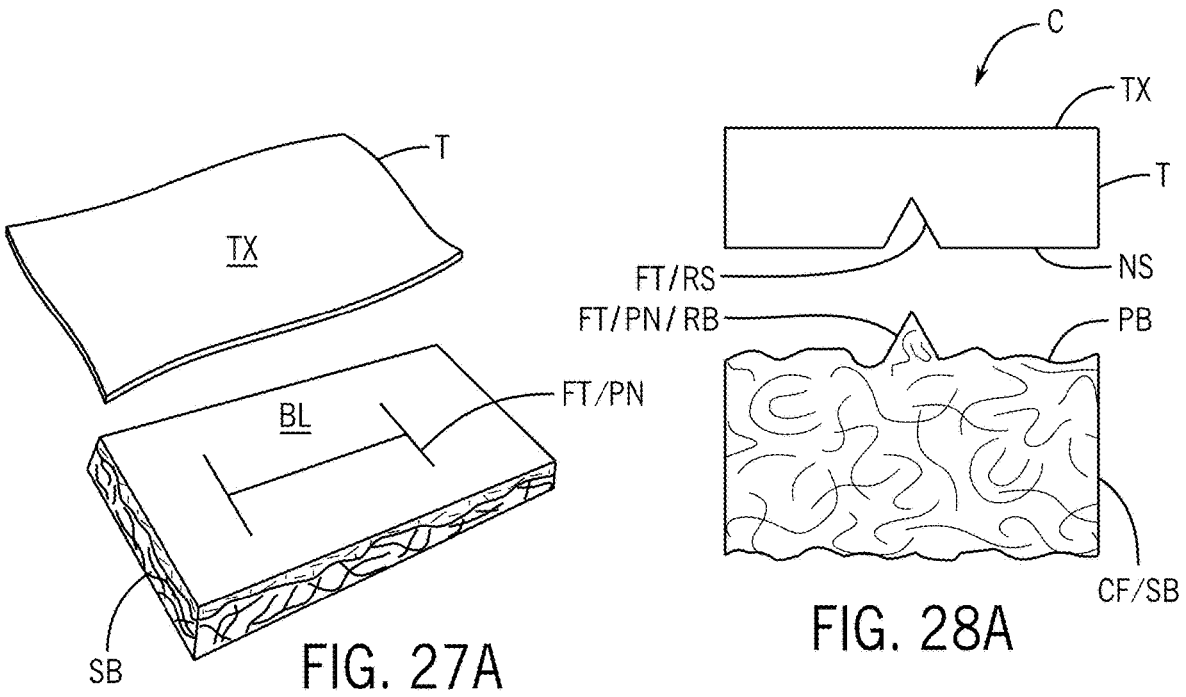
FIG. 27A
FIG. 28A
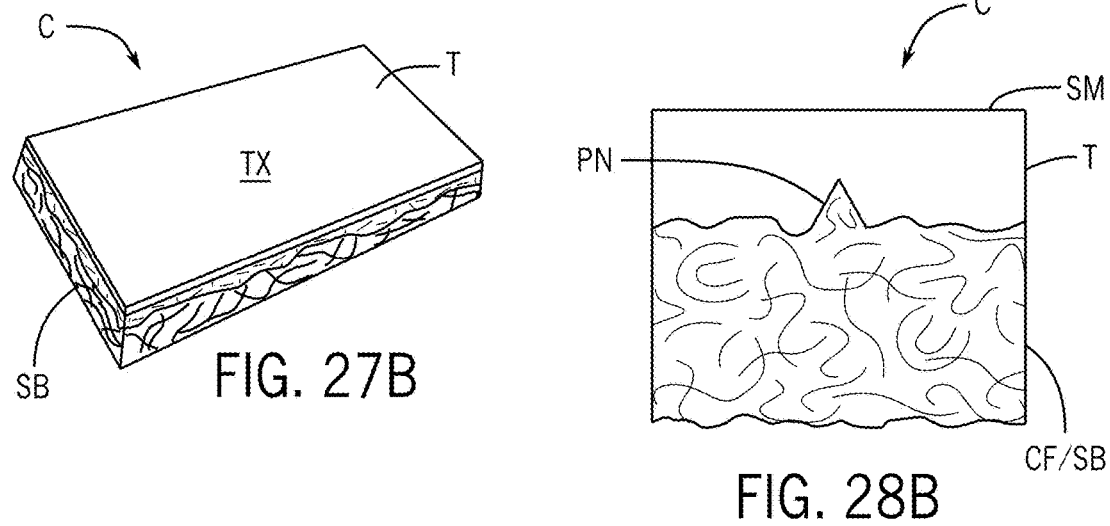
FIG. 27B
FIG. 28B

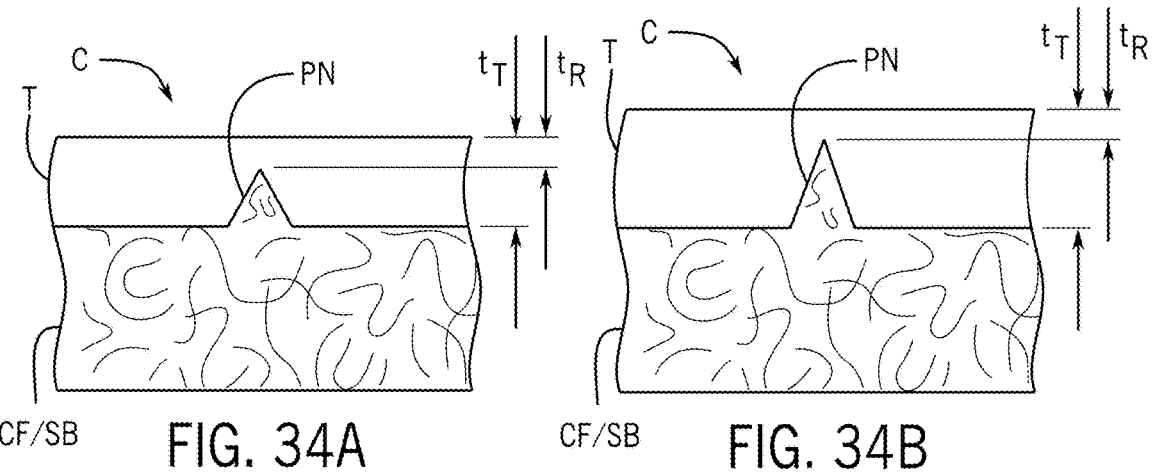
FIG. 34A
FIG. 34B
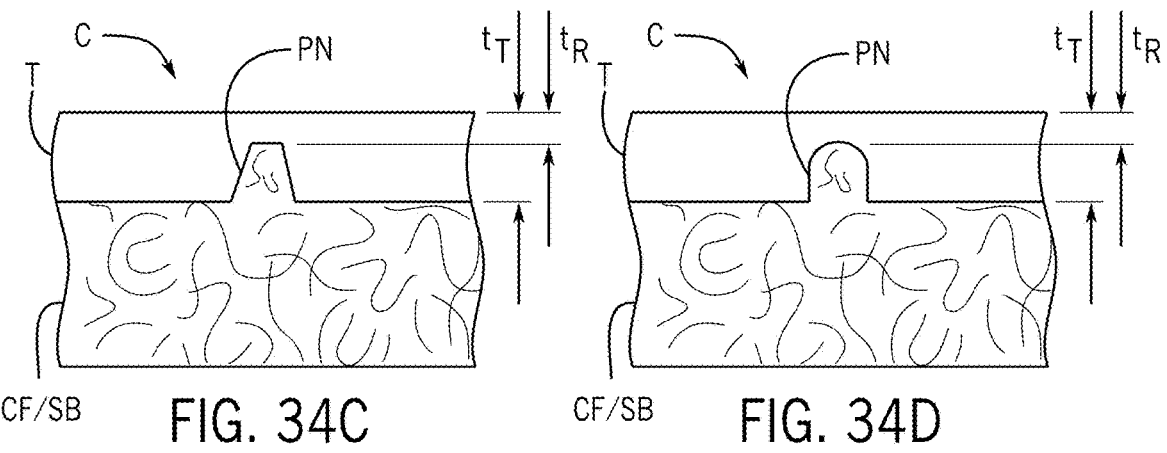
FIG. 34C
FIG. 34D
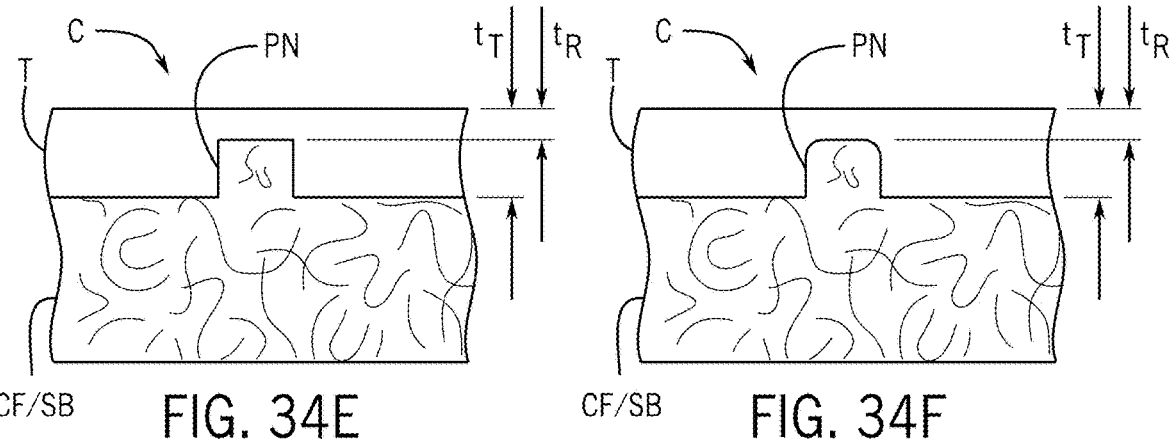
FIG. 34E
FIG. 34F

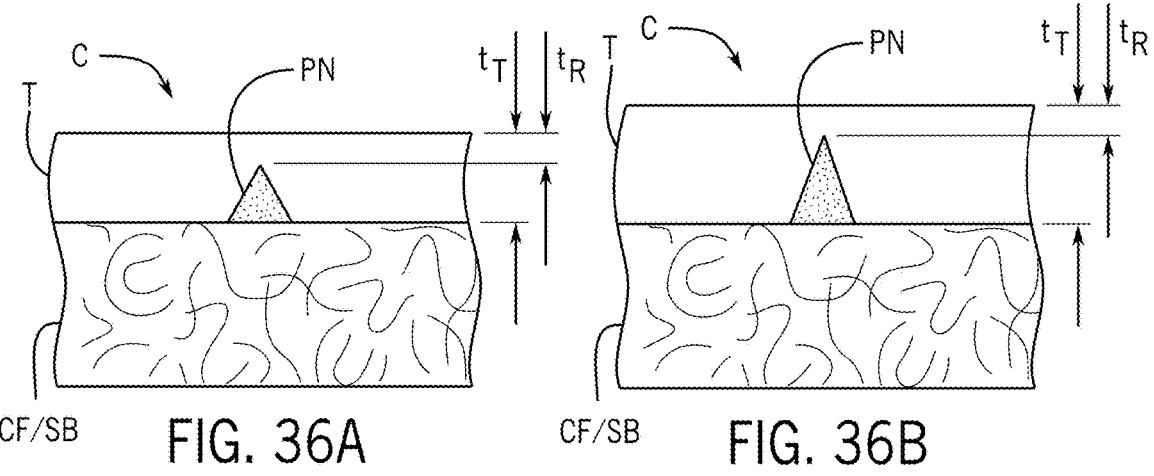
FIG. 36A            FIG. 36B
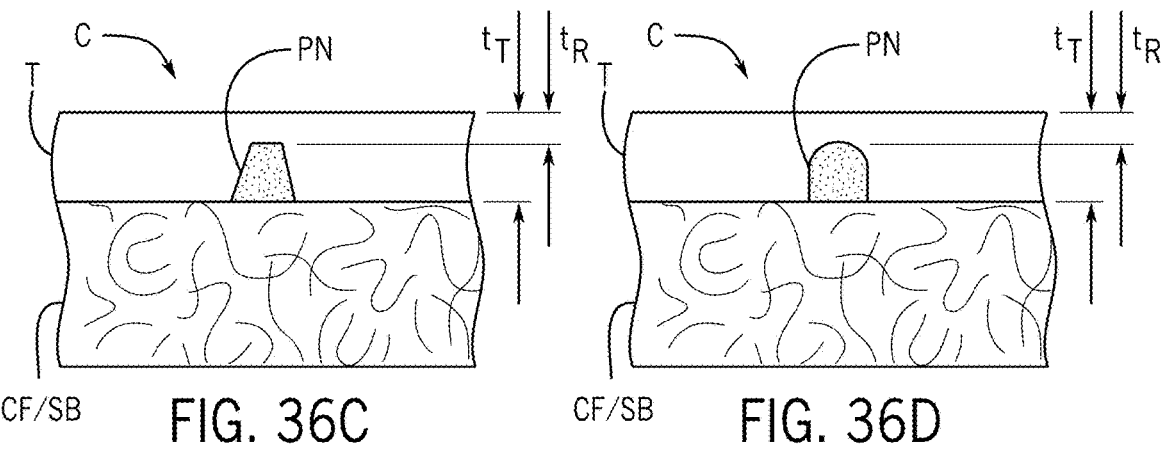
FIG. 36C            FIG. 36D
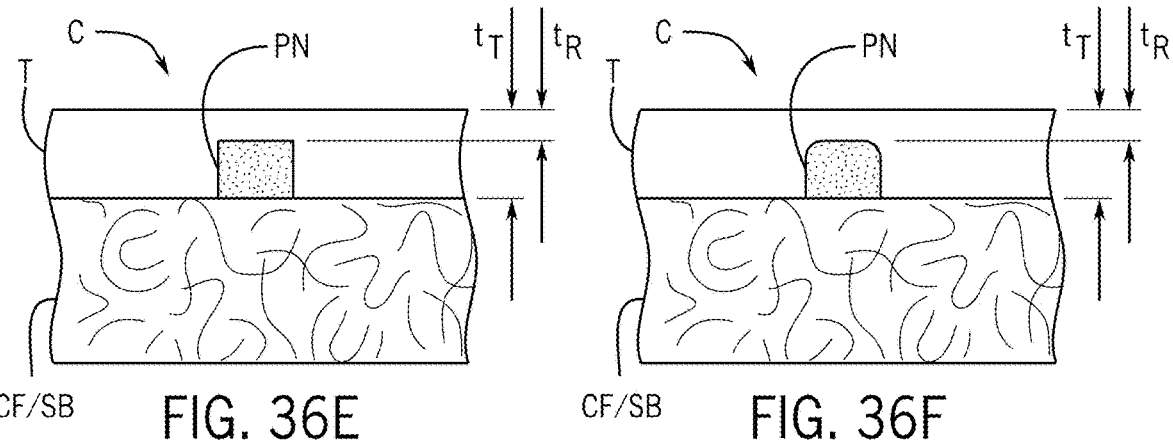
FIG. 36E            FIG. 36F

COMPONENT FOR VEHICLE INTERIOR

CROSS-REFERENCE TO RELATED APPLICATIONS

The present application is a continuation of PCT/International Patent Application No. PCT/US23/34407 titled "COMPONENT FOR VEHICLE INTERIOR" filed Oct. 3, 2023, which claims the benefit of U.S. Provisional Patent Application No. 63/413,782 titled "COMPONENT FOR VEHICLE INTERIOR" filed Oct. 6, 2022.

The present application claims priority to and incorporates by reference in full the following patent applications: (a) U.S. Provisional Patent Application No. 63/413,782 titled "COMPONENT FOR VEHICLE INTERIOR" filed Oct. 6, 2022; (b) PCT/International Patent Application No. PCT/US23/34407 titled "COMPONENT FOR VEHICLE INTERIOR" filed Oct. 3, 2023.

The present application incorporates by reference in full the following patent applications: (a) PCT/CN2021/088929 titled "VEHICLE INTERIOR COMPONENT" filed Apr. 22, 2021; (b) U.S. patent application Ser. No. 17/941,579 titled "COMPONENT FOR VEHICLE INTERIOR" filed Sep. 9, 2022.

FIELD

The present invention relates to a component for a vehicle interior.

BACKGROUND

It is known to provide a component (e.g. trim panel) for a vehicle interior. Interior trim components are commonly provided as headliners, door panels, instrument panels, center consoles, and various other components in a vehicle. It is also known in vehicles to provide airbags behind the trim component. It is further known to provide a weakened area such as a score line in the trim component to direct the airbag during an airbag deployment process. It is further known to form the trim component by a compression forming process.

It would be advantageous to provide an improved trim component (e.g. trim panel, instrument panel, or door panel) for a vehicle interior providing an exit for deployment of an airbag.

It would also be advantageous to provide an improved trim component for a vehicle interior with an exit for deployment of an airbag that is not readily perceptible (e.g. having a smooth visible surface) from the vehicle interior.

It would further be advantageous to provide an improved trim component with reduced break-through energy to facilitate effective airbag deployment. It would further be advantageous to manufacture an improved trim component in a single mold apparatus.

SUMMARY

The present invention relates to a component for a vehicle interior configured to comprise a composite structure may comprise a substrate and a cover. The substrate may comprise a base layer and a feature configured to facilitate formation of an opening through the cover. The cover may comprise a cover layer. The cover may be provided over the substrate. The base layer of the substrate may comprise a fiber panel formed into a compressed fiber panel. The substrate may comprise a structural substrate may comprise the compressed fiber panel. The feature of the substrate may comprise a projection arrangement for the structural substrate. The projection arrangement may comprise at least one projection configured to initiate formation of the opening. The cover may be molded onto the substrate. The projection arrangement may comprise a set of projections integrally formed with the base layer. The projection arrangement may comprise a set of projections configured to project from the base layer into the cover and the cover may comprise a set of cavities aligned with the set of projections. The projection arrangement may comprise a tear line for formation of the opening. The tear line may comprise a center segment configured to initiate the opening and a set of lateral segments configured to complete the opening. The projection arrangement may comprise a set of projections and a set of connectors. The projection arrangement may comprise a pattern of projections and the pattern of projections may comprise a set of nubs and a set of connectors. The compressed fiber panel may comprise the base layer of the substrate may comprise a generally rigid fiber panel. The feature of the substrate may comprise at least one of a set of generally rigid projections and/or a set of projections molded on the compressed fiber panel and/or a set of projections may comprise a set of nubs formed of a resin on the compressed fiber panel and/or the projection arrangement etc. The base layer may comprise an upper surface providing the feature of the substrate and a lower surface may comprise a recess. The recess may be offset from the feature of the substrate. The recess may be configured to facilitate formation of the opening for deployment of the airbag. The recess may comprise an indentation at an inner surface of the cover layer. The substrate may comprise at least one feature formed on the substrate adjacent the recess. The cover layer may comprise an outer surface may comprise a substantially uniform exterior surface for the cover.

The present invention relates to a component configured to comprise a substrate may comprise a fiber panel configured to be formed into a structural substrate and a cover may comprise a cover layer provided on the substrate. The structural substrate may comprise a projection arrangement. The cover layer may comprise a recess at an inner surface in alignment with the projection arrangement of the substrate. The recess at the inner surface of the cover layer and the projection of the substrate may be formed to facilitate deployment of the airbag by facilitating formation of an opening through the cover layer. The cover layer may comprise a molded skin layer and the recess may be formed as an indentation in the inner surface of the molded skin layer. The cover layer may comprise an outer surface opposite the inner surface of the cover layer and the outer surface may comprise a substantially uniform exterior surface for the cover. The cover layer may comprise a skin material and the substrate may comprise a composite material and the skin material may be softer than the composite material. The component may be formed by a method may comprise the steps of forming the structural substrate as a compression-formed fiber panel from the substrate by compression of the fiber panel in a mold tool and molding the cover as the skin layer on the substrate. The structural substrate may comprise the projection arrangement. An inner surface of the skin layer may comprise a recess formed by molding the skin layer on the projection of the structural substrate. The step of molding the cover as the skin layer on the substrate may comprise injection molding of a thermoplastic material on the substrate. The cover layer may comprise an injection molded thermoplastic material. The component may comprise at least one of an instrument panel and a dashboard and a door panel and a steering wheel assembly and a console and a cockpit and a knee bolster and a trim component and a trim panel etc.

The present invention relates to a component for an interior of a vehicle configured to facilitate formation of an opening for deployment of an airbag into the interior of the vehicle comprising a composite structure comprising a substrate and a cover. The substrate may comprise a base layer and a feature configured to facilitate formation of the opening through the cover. The cover may comprise a cover layer comprising an inside surface. The cover may be provided over the substrate. The feature of the substrate may be configured to initiate formation of the opening. The cover may be provided over the base layer of the substrate. The substrate may comprise a structural substrate. The feature of the substrate may comprise a projection arrangement. The projection arrangement may comprise at least one protrusion. The projection arrangement may comprise a set of projections. The set of projections may comprise a set of nubs. The set of projections may comprise a set of ribs. The set of projections may comprise a set of connectors connecting a set of nubs. The base layer may comprise a material; the projection arrangement may comprise a set of projections formed from the material. The projection arrangement may comprise a set of projections integrally formed with the base layer. The projection arrangement may comprise a tear line. The projection arrangement may comprise projections configured to project from the base layer toward the cover. The projection arrangement may comprise projections configured to project from the base layer into the cover. The cover may comprise a set of cavities aligned with a set of projections of the substrate. The set of projections of the substrate may be configured to fit within the set of cavities of the cover. The inside surface of the cover layer may comprise a cavity aligned with the feature of the substrate. The feature of the substrate may be configured to fit within the cavity of the inside surface of the cover layer. The feature of the substrate may comprise an initiator for formation of the opening for deployment of the airbag; the initiator may comprise a center segment configured to initiate the opening and a set of lateral segments configured to complete the opening. The cover may comprise a feature comprising an initiator configured to provide for formation of the opening for deployment of the airbag. The feature of the substrate and the feature of the cover may together facilitate formation of the opening for deployment of the airbag. The cover may be formed over the substrate. The cover may be molded onto the substrate. The feature of the substrate may comprise a projection within a feature of the inside surface of the cover layer; the feature of the inside surface of the cover layer may comprise a recess configured to facilitate formation of the opening through the cover. The projection may comprise a projection arrangement. The projection arrangement may comprise a pattern of projections. The pattern of projections may comprise a center segment and a set of lateral segments. The pattern of projections may comprise a set of nubs and a set of connectors. The feature of the inside surface of the cover layer may be formed by the feature of the substrate when the cover is formed onto the substrate. The cover may comprise a feature configured to initiate formation of the opening through the cover for deployment of the airbag into the interior of the vehicle. The base layer of the substrate may comprise a generally rigid fiber panel. The feature of the substrate may comprise a generally rigid projection. The base layer of the substrate may comprise a compressed fiber panel comprising the feature of the substrate. The feature of the substrate may comprise a generally rigid projection formed in the compressed fiber panel. The feature of the substrate may comprise a generally rigid projection formed on the compressed fiber panel. The feature of the substrate may comprise a projection formed on the compressed fiber panel. The feature of the substrate may comprise a projection integrally-formed on the compressed fiber panel. The feature of the substrate may comprise a projection molded on the compressed fiber panel. The feature of the substrate may comprise a projection comprising a set of nubs molded on the compressed fiber panel. The feature of the substrate may comprise a projection comprising a set of nubs injection-molded on the compressed fiber panel. The feature of the substrate may comprise a projection comprising a set of nubs formed of a resin on the compressed fiber panel. The substrate may comprise a front side and a rear side opposite the front side; the rear side of the substrate may be configured for contact from the airbag to establish the opening for deployment of the airbag; the front side of the substrate may comprise the feature of the substrate. The base layer may comprise an upper surface providing the feature of the substrate and a lower surface comprising a recess. The recess may be offset from the feature of the substrate; the recess may be configured to facilitate formation of opening for deployment of the airbag. The composite structure may be configured to facilitate formation of an opening for the airbag to facilitate deployment of the airbag. The composite structure may comprise the cover layer formed on the base layer of the substrate; the cover layer may be configured to provide an exterior surface; the feature of the substrate may not be generally visible at the exterior surface of the cover. The composite structure may comprise the cover layer molded on the base layer of the substrate. The cover layer may comprise a recess configured to facilitate formation of the opening through the cover. The recess may be formed as an indentation in the inner surface of the cover layer. The projection of the substrate may be in the recess of the cover layer. The projection of the substrate may penetrate the inner surface of the cover layer to form the recess of the cover layer. The recess may be formed by molding the cover layer on the projection of the substrate. The substrate may comprise at least one feature at the rear side of the substrate adjacent the recess. The at least one feature may comprise at least one of (a) a resin; (b) a thermoplastic resin; (c) polypropylene; (d) acrylonitrile butadiene styrene; (e) polycarbonate. The cover layer may comprise an injection molded thermoplastic material. The cover layer may comprise at least one of (a) a TPE material; (b) a TPV material; (c) a PU material. The inside surface of the cover layer may comprise a feature configured to facilitate formation of the opening through the cover. The feature of the inside surface of the cover layer may comprise a recess. The recess in the cover layer may have a nominal depth in a range of between 0.3 mm and 1.5 mm. A nominal residual thickness at the recess of the cover layer may comprise a nominal thickness of the cover layer minus the nominal depth of the recess in the cover layer; the nominal residual thickness at the recess of the cover layer may be in a range of between 0.3 mm and 1.5 mm. The cover layer may have a nominal thickness in a range of between about 0.7 mm and about 3 mm. The substrate may comprise a fiber panel with a nominal thickness of between about 1.0 mm and 2.5 mm. The component may comprise at least one of (a) an instrument panel; (b) a dashboard; (c) a door panel; (d) a steering wheel assembly; (e) a console; (f) a cockpit; (g) a knee bolster; (h) a trim component.

The present invention relates to a component for a vehicle interior configured to provide an opening for deployment of an airbag through the opening comprising (a) a substrate comprising a base layer; and (b) a cover comprising a cover layer. The cover layer may comprise an inner surface coupled to the substrate. The cover layer may comprise a recess in the inner surface of the cover layer. The substrate may comprise a projection aligned with the recess in the cover layer. The recess in the inner surface of the cover layer and the projection of the substrate may be configured to facilitate deployment of the airbag through the opening by facilitating formation of the opening through the cover layer. The recess may be formed as an indentation in the inner surface of the cover layer. The projection of the substrate may be in the recess of the cover layer. The projection of the substrate may penetrate the inner surface of the cover layer to form the recess of the cover layer. The cover layer may comprise a molded thermoplastic material; the substrate may comprise a fiber panel. The cover layer may comprise a molded thermoplastic material; the substrate may comprise an injection molded component. The cover layer may comprise a skin material; the substrate may comprise a composite material; the skin material may be softer than the composite material. The cover layer may comprise a skin layer; the projection may comprise a protrusion. The cover layer may be molded on the substrate. The recess may be formed by molding the cover layer on the projection of the substrate. The cover layer may comprise an outer surface opposite the inner surface of the cover layer; the outer surface may comprise a substantially planar surface opposite the recess in the inner surface of the cover layer.

The present invention relates to a component for a vehicle interior formed in a mold and configured to facilitate deployment of an airbag comprising (a) a substrate comprising a fiber panel; and (b) a cover comprising a skin layer. The skin layer may comprise an inner surface coupled to the substrate. The skin layer may comprise a recess in the inner surface of the skin layer. The substrate may comprise a protrusion aligned with the recess in the skin layer. The substrate may comprise a rear side configured for contact from the airbag to establish an opening for deployment of the airbag. The protrusion of the substrate may be formed by (a) compressing a first portion of the fiber panel between a first surface and a second surface of the mold to a first thickness; and (b) compressing a second portion of the fiber panel between the first surface and the second surface of the mold to a second thickness. The recess of the skin layer may be formed by molding the skin layer on the protrusion of the substrate.

The present invention relates to a method of manufacturing a component for a vehicle interior configured to provide an opening for deployment of an airbag through the opening in a mold comprising: (a) providing a pre-form substrate; (b) disposing the pre-form substrate onto a first surface of the mold; (c) compressing a first portion of the pre-form substrate between the first surface of the mold and a second surface of the mold to form the pre-form substrate into a compression-formed component having a shape corresponding to a first contour of the first surface and a second contour of the second surface; (d) forming a second portion of the pre-form substrate between the first surface of the mold and the second surface of the mold to form a protrusion in the compression-formed component; and (e) molding a skin layer on the compression-formed component. An inner surface of the skin layer may comprise a recess formed by molding the skin layer on the protrusion of the compression-formed component. The recess in the inner surface of the skin layer and the protrusion of the compression-formed component may be configured to facilitate deployment of the airbag through the opening by facilitating formation of the opening through the skin layer. The method may comprise a step of injecting resin into the mold to form a feature on a rear side of the compression-formed component. The step of molding a skin layer on the compression-formed component may comprise molding the skin layer between the compression-formed component and a third surface of the mold. The step of molding a skin layer on the compression-formed component may comprise molding the skin layer on a top surface of the compression-formed component and on an edge of the compression-formed component.

The present invention relates to a method of manufacturing a component for a vehicle interior configured to provide an opening for deployment of an airbag through the opening in a mold comprising (a) forming a substrate in the mold; and (b) molding a skin layer on the substrate. The substrate may comprise a protrusion. An inner surface of the skin layer may comprise a recess formed by molding the skin layer on the protrusion of the substrate. The step of forming a substrate in the mold may comprise injection molding the substrate. The step of molding a skin layer on the substrate may comprise injection molding a thermoplastic material on the substrate. The thermoplastic material may comprise at least one of (a) a TPE material; (b) a TPV material; (c) a PU material.

The present invention relates to a component for a vehicle interior configured to provide an opening for deployment of an airbag through the opening comprising a substrate and a cover comprising a skin layer. The skin layer may comprise an inner surface coupled to the substrate. The skin layer may comprise a recess in the inner surface of the skin layer. The substrate may comprise a protrusion aligned with the recess in the skin layer. The recess in the inner surface of the skin layer and the protrusion of the substrate may be configured to facilitate deployment of the airbag through the opening by facilitating formation of the opening through the skin layer. The recess may be formed as an indentation in the inner surface of the skin layer. The recess may comprise a notch. The protrusion of the substrate may be in the recess of the skin layer. The protrusion of the substrate may penetrate the inner surface of the skin layer to form the recess of the skin layer. The protrusion may comprise an angled surface. The skin layer may be molded on the substrate. The recess may be formed by molding the skin layer on the protrusion of the substrate. The skin layer may comprise an injection molded thermoplastic material. The skin layer may comprise a generally opaque material. The skin layer may comprise at least one of (a) a TPE material; (b) a TPV material; (c) a PU material. The skin layer may comprise a skin material; the substrate may comprise a composite material; the skin material may be softer than the composite material. The skin layer may be configured to provide an exterior surface of the component. The skin layer may comprise an outer surface opposite the inner surface of the skin layer; the outer surface may comprise a substantially planar surface opposite the recess in the inner surface of the skin layer. The substrate may comprise a panel comprising fibers. The substrate may comprise a fiber panel. A rear side of the substrate may be configured for contact from the airbag to establish the opening for deployment of the airbag. The rear side of the substrate may be configured to support an airbag module comprising the airbag. The substrate may comprise at least one feature at the rear side of the substrate adjacent the recess of the skin layer. The at least one feature may comprise at least one of (a) a resin; (b) a thermoplastic resin;

7

(c) polypropylene; (d) acrylonitrile butadiene styrene; (e) polycarbonate. The at least one feature may be formed on the rear side of the substrate. The substrate may comprise a recess at the rear side of the substrate adjacent the recess of the skin layer. The recess of the substrate may be configured to facilitate deployment of the airbag through the opening by facilitating formation of the opening through the skin layer. The skin layer may comprise a thermoplastic material; the substrate may comprise a fiber panel; the substrate may comprise at least one feature at the rear side of the substrate formed from the thermoplastic material of the skin layer. The substrate may comprise an injection molded component. The component may comprise at least one of (a) an instrument panel; (b) a dashboard; (c) a door panel; (d) a steering wheel assembly; (e) a console; (f) a cockpit; (g) a knee bolster; (h) a trim component.

The present invention relates to a component for a vehicle interior formed in a mold and configured to facilitate deployment of an airbag comprising a substrate comprising a fiber panel and a cover comprising a skin layer. The skin layer may comprise an inner surface coupled to the substrate. The skin layer may comprise a recess in the inner surface of the skin layer. The substrate may comprise a protrusion aligned with the recess in the skin layer. The substrate may comprise a rear side configured for contact from the airbag to establish an opening for deployment of the airbag. The protrusion of the substrate may be formed by (a) compressing a first portion of the fiber panel between a first surface and a second surface of the mold to a first thickness; and (b) compressing a second portion of the fiber panel between the first surface and the second surface of the mold to a second thickness. The recess of the skin layer may be formed by molding the skin layer on the protrusion of the substrate.

The present invention relates to a method of manufacturing a component for a vehicle interior configured to provide an opening for deployment of an airbag through the opening in a mold comprising (a) providing a pre-form substrate; (b) disposing the pre-form substrate onto a first surface of the mold; (c) compressing a first portion of the pre-form substrate between the first surface of the mold and a second surface of the mold to form the pre-form substrate into a compression-formed component having a shape corresponding to a first contour of the first surface and a second contour of the second surface; (d) forming a second portion of the pre-form substrate between the first surface of the mold and the second surface of the mold to form a protrusion in the compression-formed component; and (e) molding a skin layer on the compression-formed component. An inner surface of the skin layer may comprise a recess formed by molding the skin layer on the protrusion of the compression-formed component. The recess in the inner surface of the skin layer and the protrusion of the compression-formed component may be configured to facilitate deployment of the airbag through the opening by facilitating formation of the opening through the skin layer. The method may comprise a step of injecting resin into the mold to form a feature on a rear side of the compression-formed component. The step of molding a skin layer on the compression-formed component may comprise molding the skin layer between the compression-formed component and a third surface of the mold. The step of molding a skin layer on the compression-formed component may comprise molding the skin layer on a top surface of the compression-formed component and on an edge of the compression-formed component.

The present invention relates to a method of manufacturing a component for a vehicle interior configured to provide an opening for deployment of an airbag through the opening in a mold comprising forming a substrate in the mold and molding a skin layer on the substrate. The substrate may comprise a protrusion. An inner surface of the skin layer may comprise a recess formed by molding the skin layer on the protrusion of the substrate. The step of forming a substrate in the mold may comprise injection molding the substrate. The step of molding a skin layer on the substrate may comprise injection molding a thermoplastic material on the substrate. The thermoplastic material may comprise at least one of (a) a TPE material; (b) a TPV material; (c) a PU material.

The present invention relates to a component for an interior of a vehicle configured to facilitate formation of an opening for deployment of an airbag into the interior of the vehicle comprising a composite structure comprising a substrate and a cover; the substrate may comprise a base layer and a feature configured to facilitate formation of the opening; the base layer may comprise a fiber panel formed into a compressed fiber panel to provide a structural substrate; the feature may comprise a projection arrangement that may comprise a set of projections; the cover may comprise a set of cavities. The projection arrangement may comprise a tear line for formation of the opening. The compressed fiber panel may comprise a generally rigid fiber panel with a set of projections/nubs formed of a resin. The base layer may comprise a recess. The cover may comprise a substantially uniform exterior surface.

FIGURES

FIGS. 11A to 11B are schematic partial section perspective views of a substrate of a component for a vehicle interior according to an exemplary embodiment.

FIGS. 12A to 12B are schematic partial section perspective views of a substrate of a component for a vehicle interior according to an exemplary embodiment.

FIGS. 13A to 13B are schematic partial section perspective views of a substrate of a component for a vehicle interior according to an exemplary embodiment.

FIGS. 22A to 22E are schematic section views of a method of manufacturing a component for a vehicle interior according to an exemplary embodiment.

FIGS. 27A to 27B are schematic perspective views of a process to form a component for a vehicle interior according to an exemplary embodiment.

FIGS. 28A to 28B are schematic partial section views of a process to form a component for a vehicle interior according to an exemplary embodiment.

FIG. 34A is a schematic partial section view of a component for a vehicle interior according to an exemplary embodiment.

FIG. 34B is a schematic partial section view of a component for a vehicle interior according to an exemplary embodiment.

FIG. 34C is a schematic partial section view of a component for a vehicle interior according to an exemplary embodiment.

FIG. 34D is a schematic partial section view of a component for a vehicle interior according to an exemplary embodiment.

FIG. 34E is a schematic partial section view of a component for a vehicle interior according to an exemplary embodiment.

FIG. 34F is a schematic partial section view of a component for a vehicle interior according to an exemplary embodiment.

FIG. 36A is a schematic partial section view of a component for a vehicle interior according to an exemplary embodiment.

FIG. 36B is a schematic partial section view of a component for a vehicle interior according to an exemplary embodiment.

FIG. 36C is a schematic partial section view of a component for a vehicle interior according to an exemplary embodiment.

FIG. 36D is a schematic partial section view of a component for a vehicle interior according to an exemplary embodiment.

FIG. 36E is a schematic partial section view of a component for a vehicle interior according to an exemplary embodiment.

FIG. 36F is a schematic partial section view of a component for a vehicle interior according to an exemplary embodiment.

DESCRIPTION

Referring to FIGS. 1A-1B and 2A-2G, a vehicle V with an interior I is shown comprising a component C shown as an instrument panel IP and a door/panel DL and a steering wheel SW (and other components such as panels, consoles, seating, etc.); as shown schematically according to an exemplary embodiment, the component shown as steering wheel C/SW and instrument panel C/IP may be configured to provide for deployment of an airbag AB from an opening at an airbag door ABD formed during deployment at an airbag exit area ABX.

Figure 20A:
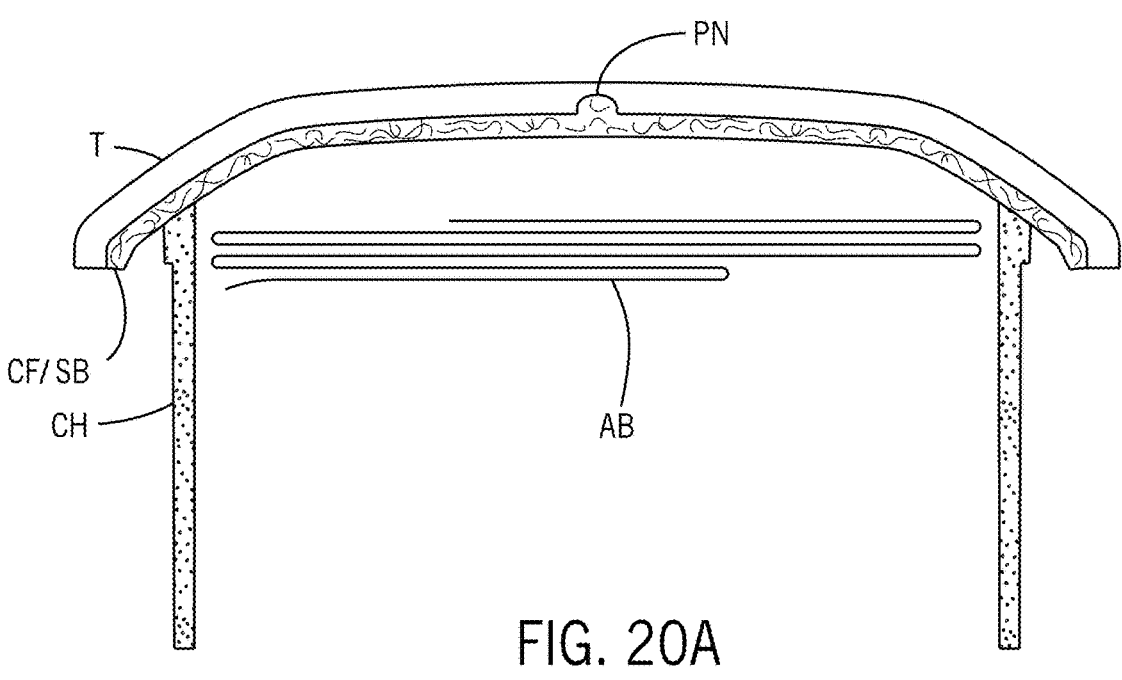
FIGS. 20A to 20B are schematic section views of a deployment of an airbag from a vehicle interior component according to an exemplary embodiment.
Figure 20B:
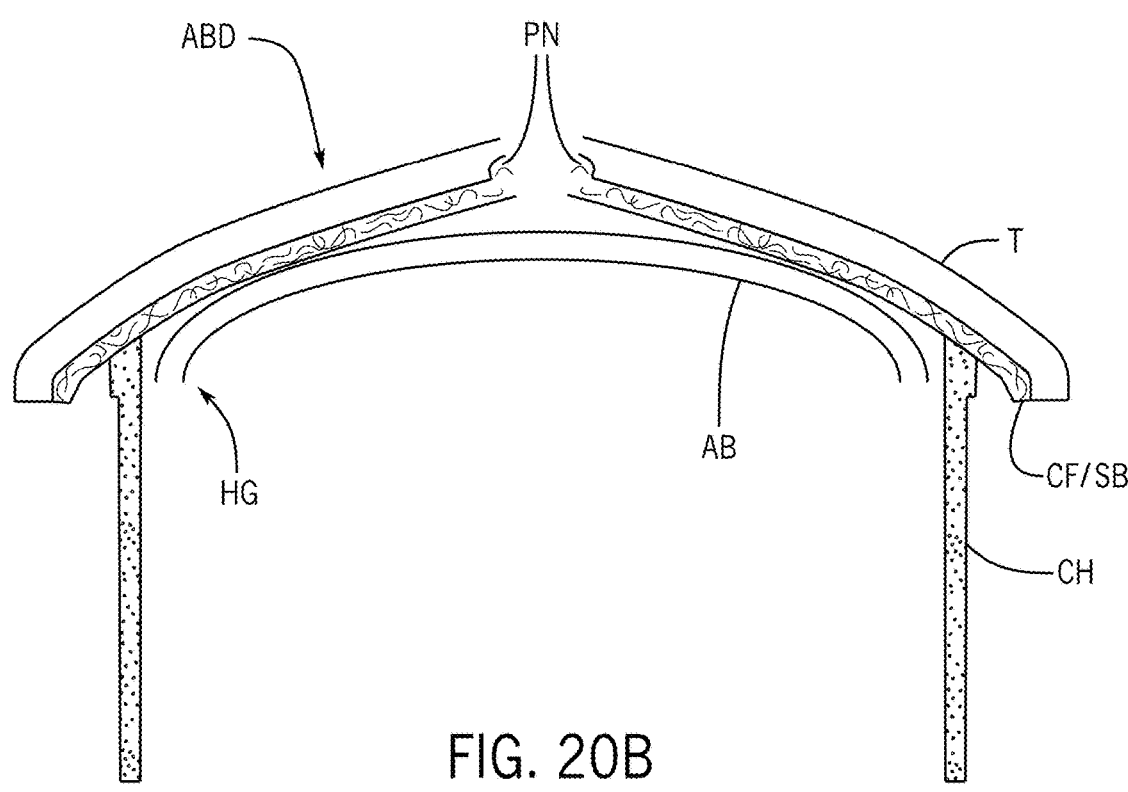
Figures 21A, 21B, 21C, 21D, 21E, 21F:
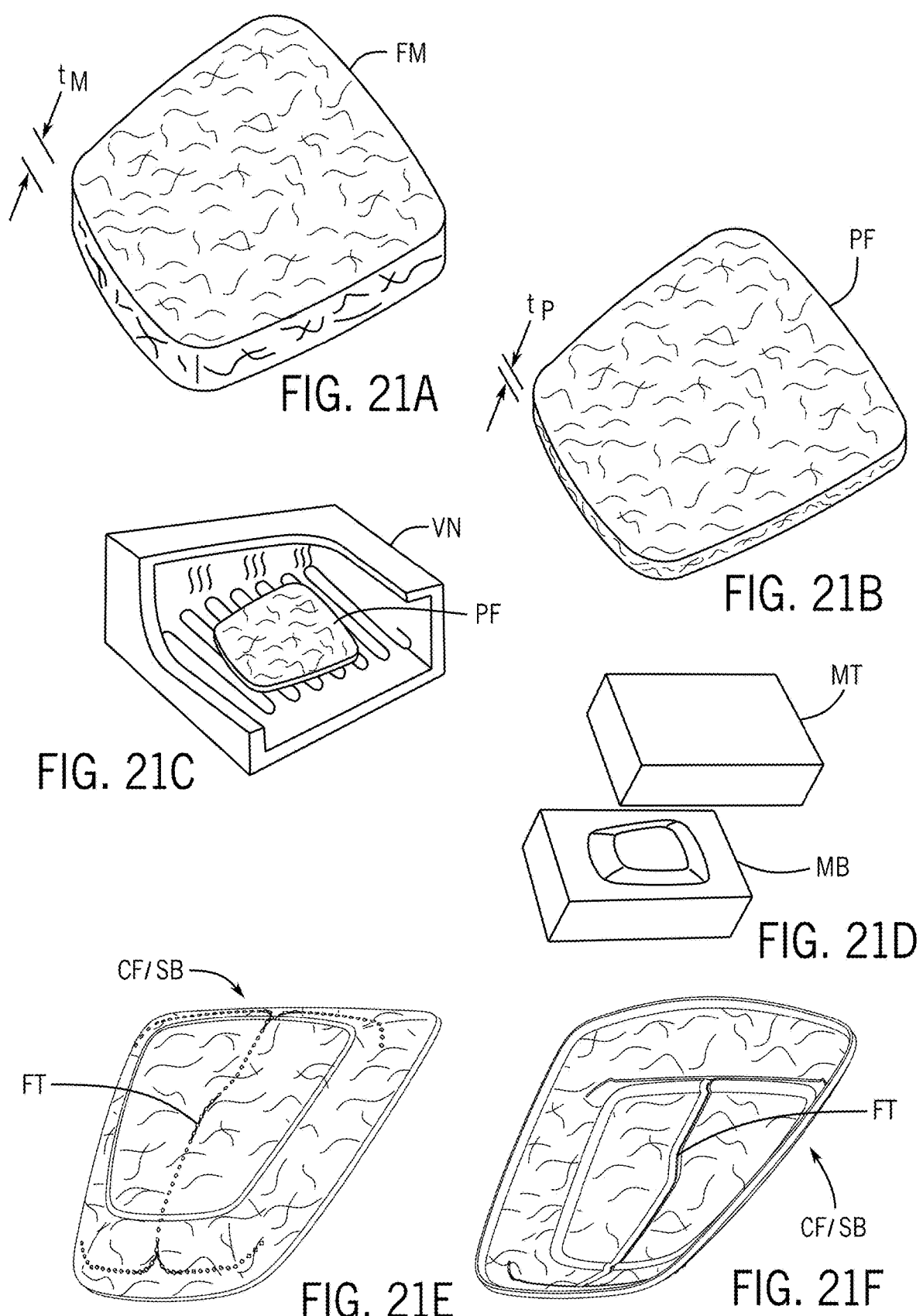
FIGS. 21A to 21B are schematic perspective views of a fiber mat being compressed into a pre-form according to an exemplary embodiment.
FIGS. 21C to 21F are schematic perspective views of a pre-form being formed into a component for a vehicle interior according to an exemplary embodiment.

As indicated schematically according to an exemplary embodiment in FIGS. 2B-2G, 3A-3F, 4A-4F and 5A-5G, the opening in the panel provided by component C for deployment of airbag AB through the opening at airbag door ABD may be provided at a seam shown as tear line TR configured to form the opening; as indicated schematically, tear line TR to form the opening at the airbag door ABD for deployment of the airbag AB may be provided in a variety of shapes/forms including an H-shaped form (FIGS. 3A-3F and 24A-24C) or U-shaped form (FIGS. 4A-4F) or a line shown as a curved line (FIGS. 5A-5G, 17, 18 and 19). See also FIGS. 20A-20B.

As shown schematically according to an exemplary embodiment in FIGS. 6A-6B, 7A-7B, 8, 9, 10, 20A-20B and 24A-24C, the component may comprise a composite structure comprising a panel/substrate shown as a compressed fiber panel CF/SB and a cover T configured to provide a cover layer with a structure/housing shown as an airbag chute CH (e.g. housing configured as a housing for an airbag module); panel/substrate CF/SB may comprise a feature FT shown as a projection PN configured in an arrangement to facilitate formation of the seam shown as tear line TR (for deployment of the airbag). See also FIGS. 3A-3F, 4A-4F and 5A-5G.

Figures 14, 15, 16:
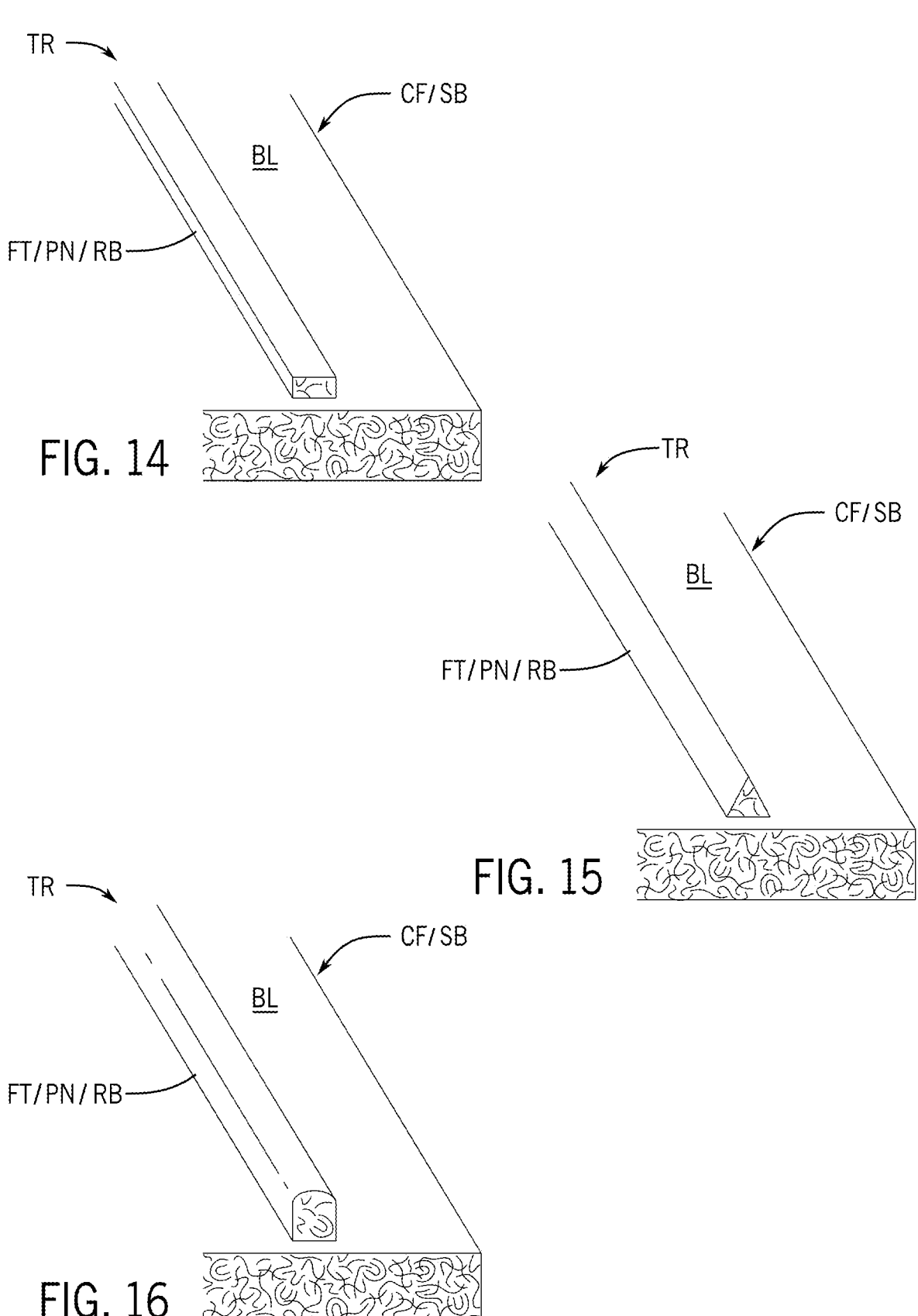
FIG. 14 is a schematic partial section perspective view of a substrate of a component for a vehicle interior according to an exemplary embodiment.
FIG. 15 is a schematic partial section perspective view of a substrate of a component for a vehicle interior according to an exemplary embodiment.
FIG. 16 is a schematic partial section perspective view of a substrate of a component for a vehicle interior according to an exemplary embodiment.

As shown schematically according to an exemplary embodiment in FIGS. 8, 9, 10, 11A-11B, 12A-12B, 13A-13B, 14, 15 and 16, feature FT shown as projection PN of base layer BL of panel/substrate CF/SB configured to facilitate formation of the seam shown as tear line TR to provide the opening for deployment of the airbag from the component may be provided in a variety of arrangements including a set of nubs NB and ribs RB and nubs NB connected by ribs RB (FIGS. 11A-11B), a set of projections PN having a rounded and/or faceted profile (FIGS. 12A-12B and 13A-13B), a projection PN shown as a rib/strip having a rectilinear profile (FIG. 14), a projection PN shown as a rib/strip having an angular profile (FIG. 15) and a projection PN shown as a rib/strip having a rounded/curved provide (FIG. 16).

Figures 17, 18, 19:
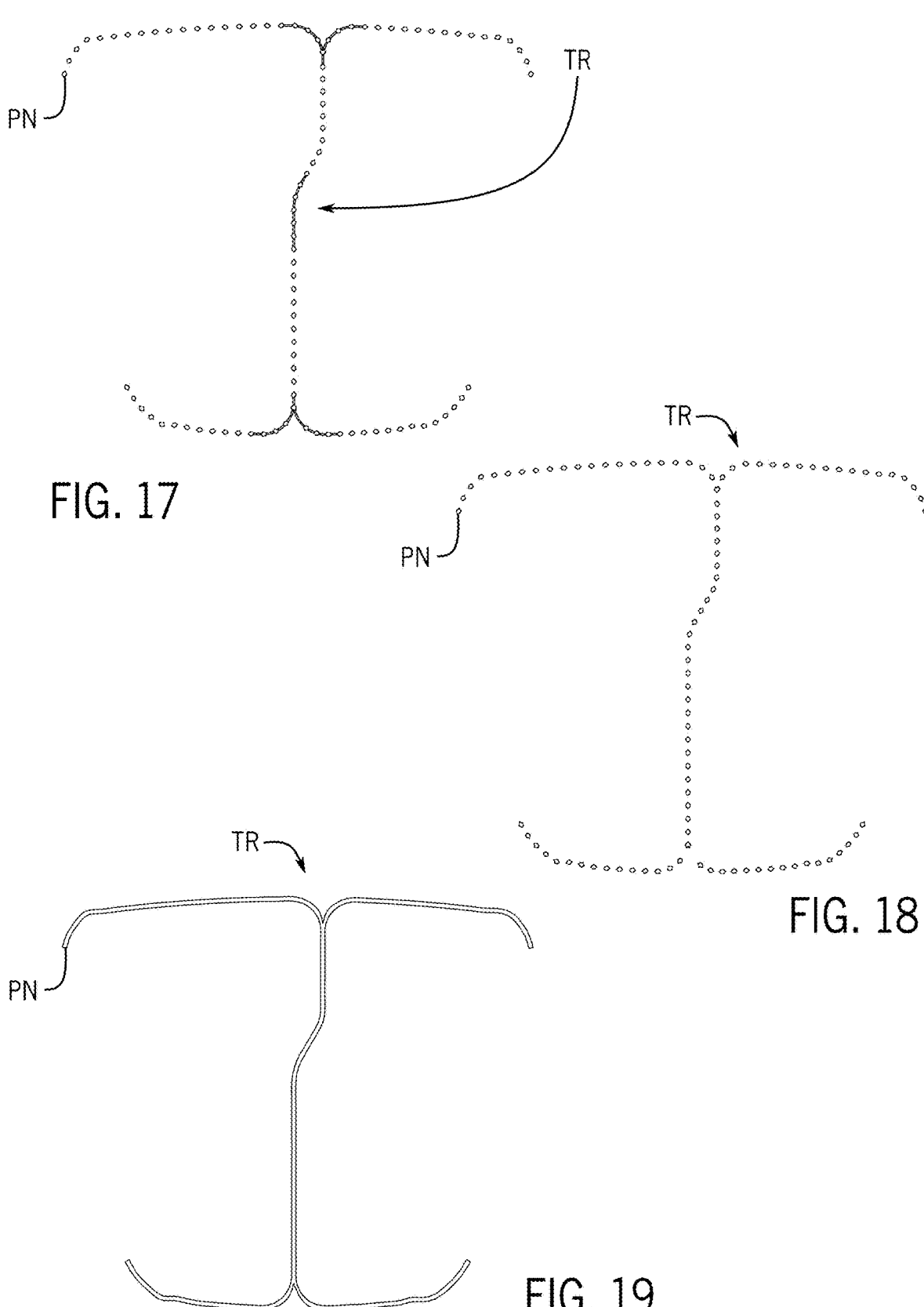
FIG. 17 is a schematic plan view of a tear line for an opening for deployment of an airbag from a vehicle interior component according to an exemplary embodiment.
FIG. 18 is a schematic plan view of a tear line for an opening for deployment of an airbag from a vehicle interior component according to an exemplary embodiment.
FIG. 19 is a schematic plan view of a tear line for an opening for deployment of an airbag from a vehicle interior component according to an exemplary embodiment.

As shown schematically according to an exemplary embodiment in FIGS. 11A-11B, 12A-12B, 13A-13B, 14, 15, 16, 17, 18 and 19, the features shown as projection/arrangement PN may be configured in a variety of shapes/forms and segments/arrangements such as segments of sets of nubs including sets of nubs connected by sets of ribs (see FIG. 17) and segments of sets of nubs (see FIG. 18) and segments of sets of ribs (see FIG. 19). See also FIGS. 3A-3F, 4A-4F and 5A-5G.

Figure 29:
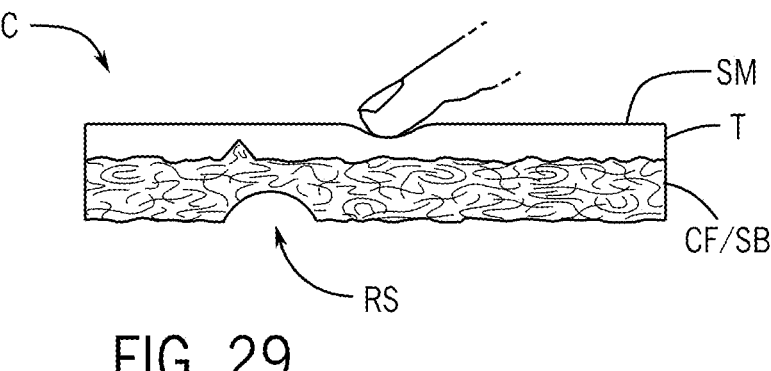
FIG. 29 is a schematic partial section view of a component for a vehicle interior according to an exemplary embodiment.
Figure 30:
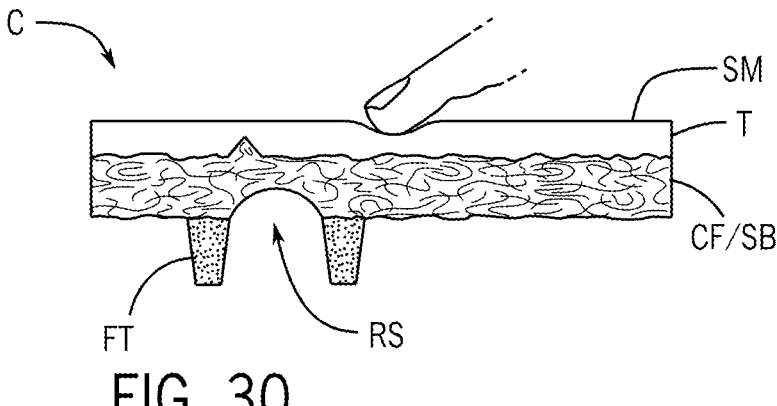
FIG. 30 is a schematic partial section view of a component for a vehicle interior according to an exemplary embodiment.
Figure 31:
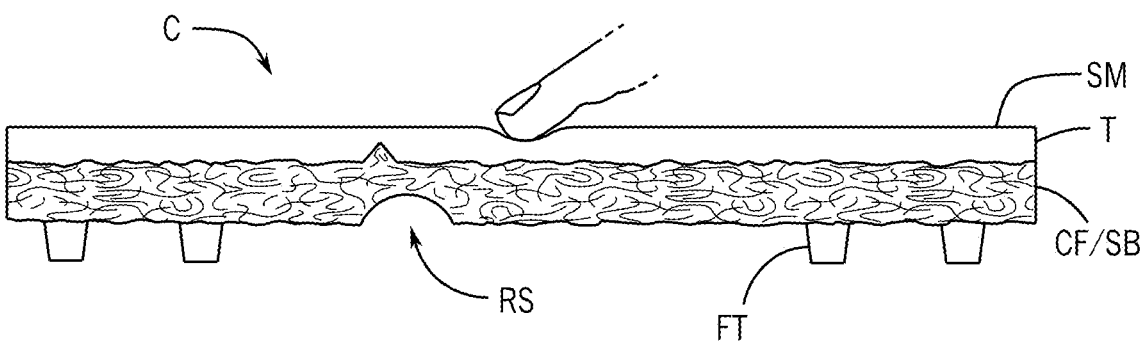
FIG. 31 is a schematic partial section view of a component for a vehicle interior according to an exemplary embodiment.
Figures 32A, 32B, 32C:
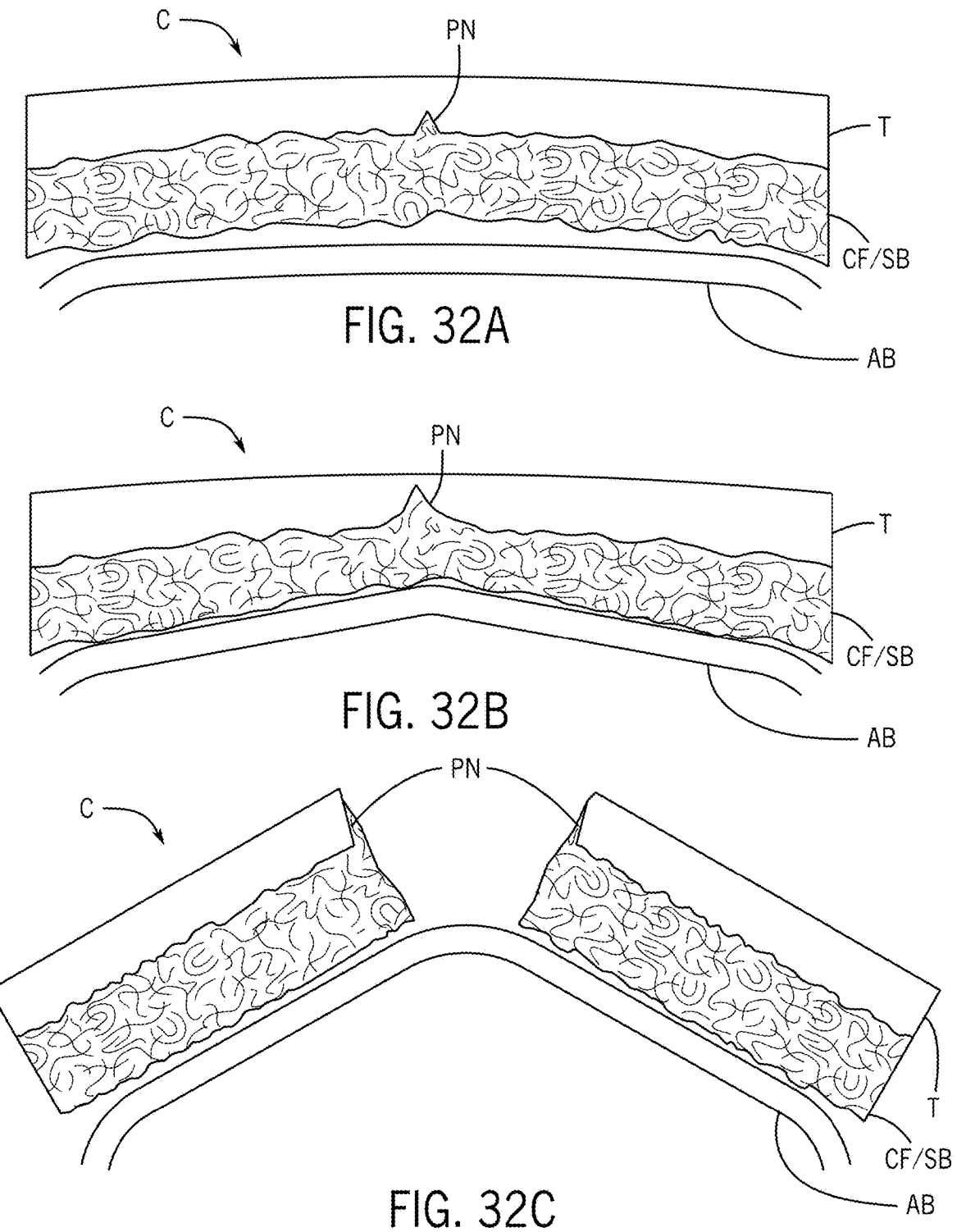
FIGS. 32A through 32C are partial schematic section views of a component for a vehicle interior according to an exemplary embodiment.
Figures 33A, 33B, 33C:
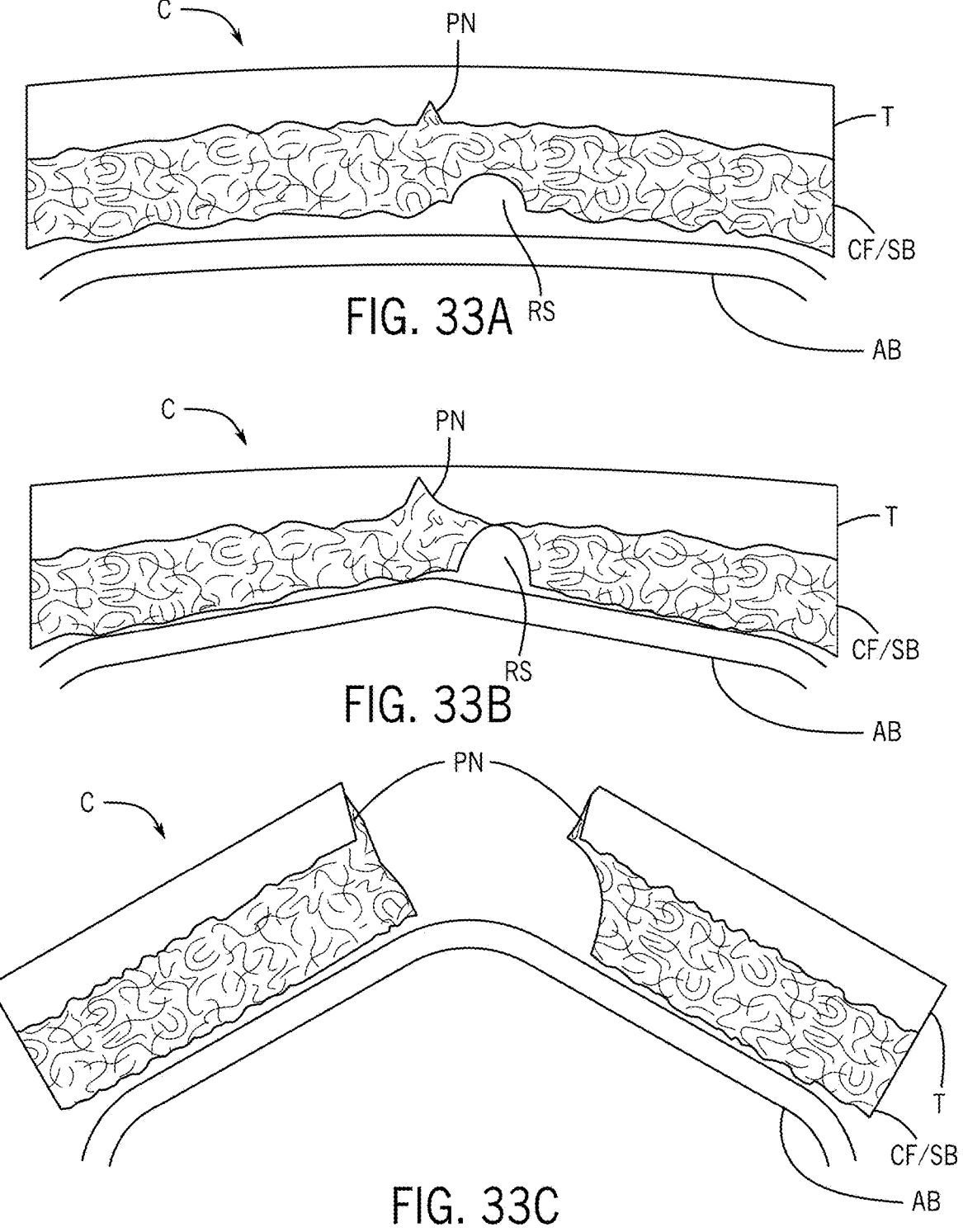
FIGS. 33A through 33C are partial schematic section views of a component for a vehicle interior according to an exemplary embodiment.
Figure 35A:
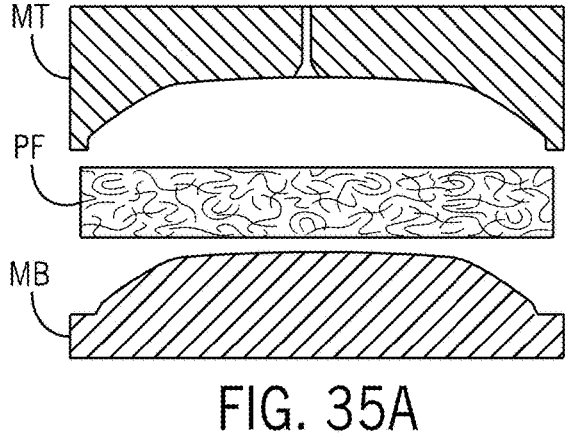
FIGS. 35A to 35E are schematic section views of a method of manufacturing a component for a vehicle interior according to an exemplary embodiment.
Figure 35B:
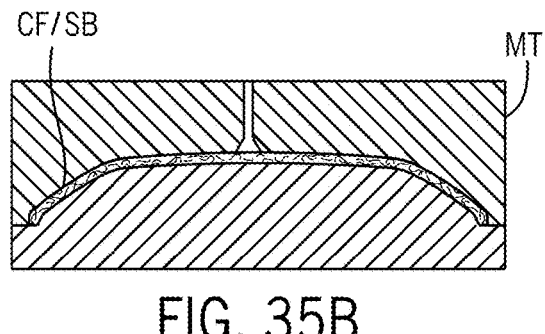
Figure 35C:
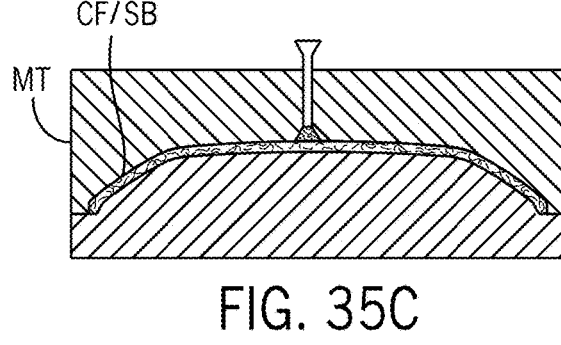
Figure 35D:
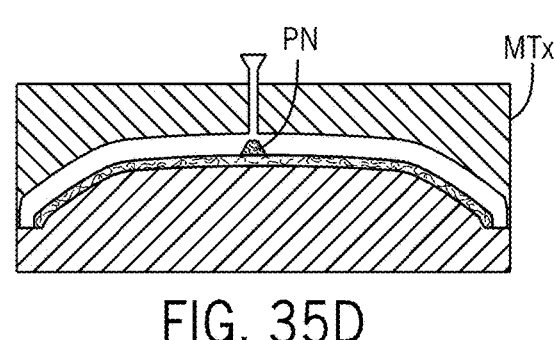
Figure 35E:
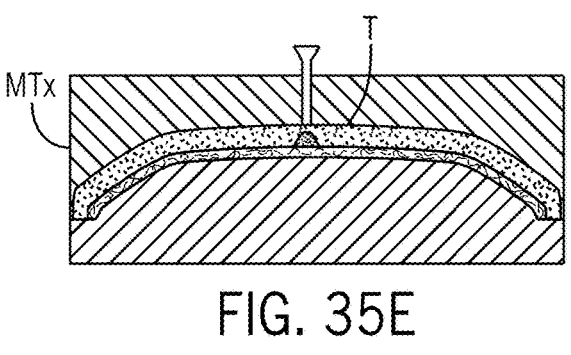
Figure 35F:
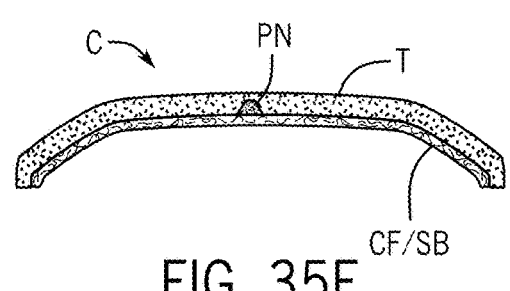
FIG. 35F is a schematic section view of a component for a vehicle interior according to an exemplary embodiment.
Figures 37A, 37B, 37C, 38A, 38B, 38C, 38D:
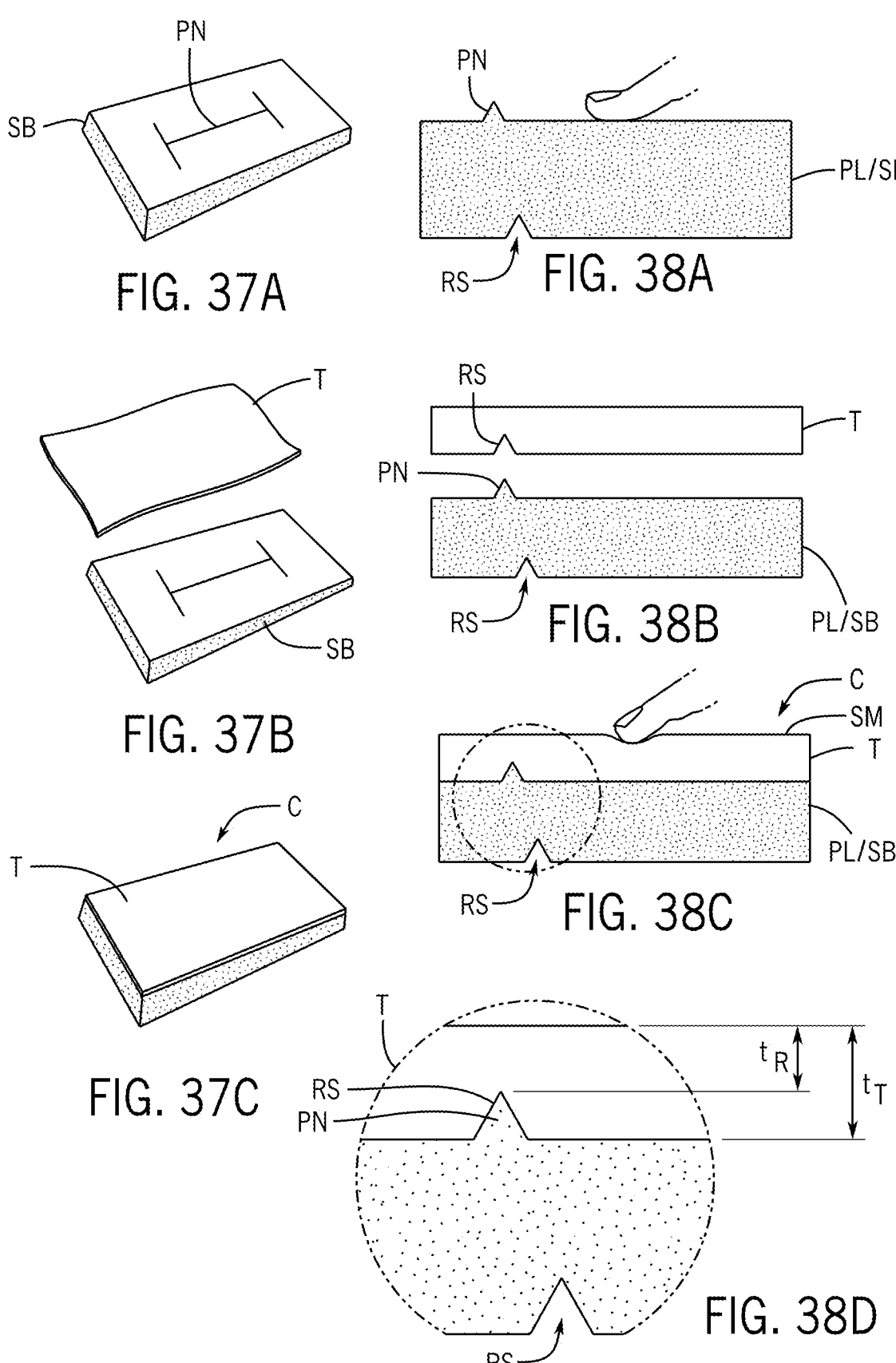
FIGS. 37A to 37C are schematic perspective views of a process to form a component for a vehicle interior according to an exemplary embodiment.
FIGS. 38A to 38D are schematic partial section views of a process to form a component for a vehicle interior according to an exemplary embodiment.
Figures 39A, 39B, 39C:
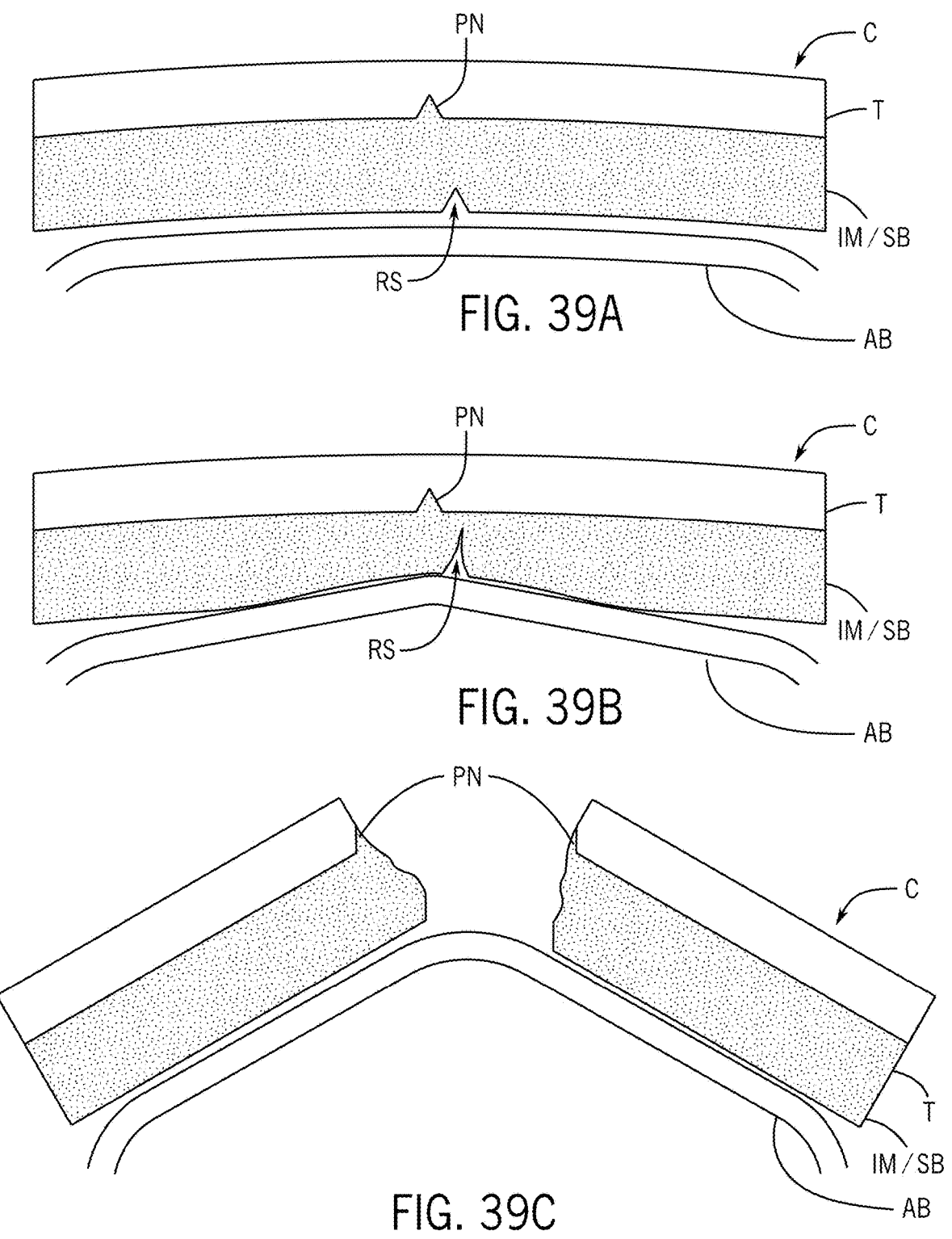
FIGS. 39A through 39C are partial schematic section views of a component for a vehicle interior according to an exemplary embodiment.

As indicated schematically according to an exemplary embodiment in FIGS. 20A-20B and 32A-32C, the feature shown as projection PN in panel/substrate SB may be configured to fit within a recess in cover T to facilitate formation of the opening at the seam/tear line for deployment of the airbag. See also FIGS. 2B-2G, 3A-3F, 4A-4F, 5A-5G, 25A-25C, 26A-26D, 27A-27B and 28A-28B. As indicated schematically according to an exemplary embodiment in FIGS. 29, 30, 31 and 33A-33C, the feature shown as projection PN in panel/substrate SB may be configured to fit within a recess in cover T and a recess RS may be provided in the bottom surface/side of panel/substrate SB to facilitate formation of the opening at the seam/tear line for deployment of the airbag; a feature FT shown as a molded rib/form may be provided at or along recess RS at the bottom surface/side of the panel/substrate SB (see FIGS. 29, 30 and 31). See also FIGS. 2B-2G, 3A-3F, 4A-4F, 5A-5G, 25A-25C, 26A-26D, 27A-27B and 28A-28B.

As indicated schematically according to an exemplary embodiment in FIGS. 2A-2G, 3A-3F, 4A-4F, 5A-5G and 24A-24C, the composite structure of the component C providing for deployment of the airbag may be configured to provide an exterior surface with an airbag exit area ABX at which the seam/tear line for the opening may not be readily visible (until deployment of the airbag through formation of the opening). See also FIGS. 20A-20B, 32A-32C, 33A-33C and 39A-39C. As indicated schematically according to an exemplary embodiment in FIGS. 2A-2G, 3A-3F, 4A-4F, 5A-5G, 20A-20B and 24A-24C, the features FT/RS in cover T and features FT/PN in substrate SB of the composite structure of component C providing for deployment of the airbag may be configured with dimensions/thickness of materials and arrangement of features in a manner to facilitate efficient formation of the opening at the seam/tear line for deployment of the airbag through cover T and substrate SB of the composite structure. See also FIGS. 2B-2G, 3A-3F, 4A-4F, 5A-5G, 25A-25C, 26A-26D, 27A-27B, 28A-28B, 32A-32C, 33A-33C and 39A-39C.

As indicated schematically according to an exemplary embodiment in FIGS. 25A-25C, 26A-26C, 27A-27B, 28A-28B, 34A-34F, 36A-36F, 37A-37C and 38A-38D, the feature shown as projection PN in the base layer of the panel/substrate CF/SB and the feature shown as recess RS in the cover layer of cover T for the composite structure of the component may be configured in a variety of shapes and dimensions/thicknesses and materials. As indicated schematically according to an exemplary embodiment shown in FIGS. 21A-21F, 22A-22E, 23A-23H, 35A-35F and 40A-40B, the composite structure comprising the panel/substrate may be formed from a fiber mat FM with thickness tM into a preform panel PF with thickness tP and treated/heated in an oven VN; preform panel PF may be formed into a compression-formed fiber panel CF/SB providing the substrate for the composite structure; panel/substrate SB may be formed in a mold tool with mold bottom MB and mold top MT to comprise a feature FT such as projection PN; cover T with feature/recess may be formed by molding over the substrate with feature/projection in a mold tool comprising a mold bottom MB and mold top MTx for forming the composite structure with substrate and cover and features as the component C. As indicated schematically according to an exemplary embodiment in FIGS. 21A-21F, 22A-22E, 25A-25C, 26A-26C, 27A-27B, 28A-28B and 34A-34F, feature/projection FT/PN may be integrally formed with the panel/substrate comprising a compressed fiber panel CF/SB; cover T may comprise a molded cover layer formed on panel/substrate CF/SB for the composite structure of the component. See also FIGS. 11A-11B, 12A-12B, 13A-13B and 40A-40B. As indicated schematically according to an exemplary embodiment in FIGS. 35A-35F and 36A-36F, feature/projection FT/PN may comprise a resin/plastic material molded onto the panel/substrate comprising a compressed fiber panel CF/SB; cover T may comprise a molded cover layer formed on panel/substrate CF/SB for the composite structure of the component. As indicated schematically according to an exemplary embodiment in FIGS. 37A-37C and 38A-38D, feature/projection FT/PN may be integrally formed with the panel/substrate comprising a molded/injection-molded panel PL/SB; cover T may comprise a molded cover layer formed on panel/substrate PL/SB for the composite structure of the component. See also FIGS. 39A-39C.

Exemplary Embodiments—A

According to an exemplary embodiment as shown schematically in the FIGURES, a component for an interior of a vehicle configured to facilitate formation of an opening for deployment of an airbag into the interior of the vehicle may comprise a composite structure comprising a substrate and a cover. The substrate may comprise a base layer and a feature configured to facilitate formation of the opening through the cover. The cover may comprise a cover layer comprising an inside surface. The cover may be provided over the substrate. The feature of the substrate may be configured to initiate formation of the opening. The cover may be provided over the base layer of the substrate. The substrate may comprise a structural substrate. The feature of the substrate may comprise a projection arrangement. The projection arrangement may comprise at least one protrusion. The projection arrangement may comprise a set of projections. The set of projections may comprise a set of nubs. The set of projections may comprise a set of ribs. The set of projections may comprise a set of connectors connecting a set of nubs. The base layer may comprise a material; the projection arrangement may comprise a set of projections formed from the material. The projection arrangement may comprise a set of projections integrally formed with the base layer. The projection arrangement may comprise a tear line. The projection arrangement may comprise projections configured to project from the base layer toward the cover. The projection arrangement may comprise projections configured to project from the base layer into the cover. The cover may comprise a set of cavities aligned with a set of projections of the substrate. The set of projections of the substrate may be configured to fit within the set of cavities of the cover. The inside surface of the cover layer may comprise a cavity aligned with the feature of the substrate. The feature of the substrate may be configured to fit within the cavity of the inside surface of the cover layer. The feature of the substrate may comprise an initiator for formation of the opening for deployment of the airbag; the initiator may comprise a center segment configured to initiate the opening and a set of lateral segments configured to complete the opening. The cover may comprise a feature comprising an initiator configured to provide for formation of the opening for deployment of the airbag. The feature of the substrate and the feature of the cover may together facilitate formation of the opening for deployment of the airbag. The cover may be formed over the substrate. The cover may be molded onto the substrate. The feature of the substrate may comprise a projection within a feature of the inside surface of the cover layer; the feature of the inside surface of the cover layer may comprise a recess configured to facilitate formation of the opening through the cover.

The projection may comprise a projection arrangement. The projection arrangement may comprise a pattern of projections. The pattern of projections may comprise a center segment and a set of lateral segments. The pattern of projections may comprise a set of nubs and a set of connectors. The feature of the inside surface of the cover layer may be formed by the feature of the substrate when the cover is formed onto the substrate. The cover may comprise a feature configured to initiate formation of the opening through the cover for deployment of the airbag into the interior of the vehicle. The base layer of the substrate may comprise a generally rigid fiber panel. The feature of the substrate may comprise a generally rigid projection. The base layer of the substrate may comprise a compressed fiber panel comprising the feature of the substrate. The feature of the substrate may comprise a generally rigid projection formed in the compressed fiber panel. The feature of the substrate may comprise a generally rigid projection formed on the compressed fiber panel. The feature of the substrate may comprise a projection integrally-formed on the compressed fiber panel. The feature of the substrate may comprise a projection molded on the compressed fiber panel. The feature of the substrate may comprise a projection comprising a set of nubs molded on the compressed fiber panel. The feature of the substrate may comprise a projection comprising a set of nubs injection-molded on the compressed fiber panel. The feature of the substrate may comprise a projection comprising a set of nubs formed of a resin on the compressed fiber panel. The substrate may comprise a front side and a rear side opposite the front side; the rear side of the substrate may be configured for contact from the airbag to establish the opening for deployment of the airbag; the front side of the substrate may comprise the feature of the substrate. The base layer may comprise an upper surface providing the feature of the substrate and a lower surface comprising a recess. The recess may be offset from the feature of the substrate; the recess may be configured to facilitate formation of the opening for deployment of the airbag. The composite structure may be configured to facilitate formation of an opening for the airbag to facilitate deployment of the airbag. The composite structure may comprise the cover layer formed on the base layer of the substrate; the cover layer may be configured to provide an exterior surface; the feature of the substrate may not be generally visible at the exterior surface of the cover. The composite structure may comprise the cover layer molded on the base layer of the substrate. The cover layer may comprise a recess configured to facilitate formation of the opening through the cover. The recess may be formed as an indentation in the inner surface of the cover layer. The projection of the substrate may be in the recess of the cover layer. The projection of the substrate may penetrate the inner surface of the cover layer to form the recess of the cover layer. The recess may be formed by molding the cover layer on the projection of the substrate. The substrate may comprise at least one feature at the rear side of the substrate adjacent the recess. The at least one feature may comprise at least one of (a) a resin; (b) a thermoplastic resin; (c) polypropylene; (d) acrylonitrile butadiene styrene; (e) polycarbonate. The cover layer may comprise an injection molded thermoplastic material. The cover layer may comprise at least one of (a) a TPE material; (b) a TPV material; (c) a PU material. The inside surface of the cover layer may comprise a feature configured to facilitate formation of the opening through the cover. The feature of the inside surface of the cover layer may comprise a recess. The recess in the cover layer may have a nominal depth in a range of between 0.3 mm and 1.5 mm. A nominal residual thickness at the recess of the cover layer may comprise a nominal thickness of the cover layer minus the nominal depth of the recess in the cover layer; the nominal residual thickness at the recess of the cover layer may be in a range of between 0.3 mm and 1.5 mm. The cover layer may have a nominal thickness in a range of between about 0.7 mm and about 3 mm. The substrate may comprise a fiber panel with a nominal thickness of between about 1.0 mm and 2.5 mm. The component may comprise at least one of (a) an instrument panel; (b) a dashboard; (c) a door panel; (d) a steering wheel assembly; (e) a console; (f) a cockpit; (g) a knee bolster; (h) a trim component.

According to an exemplary embodiment as shown schematically in the FIGURES, a component for a vehicle interior configured to provide an opening for deployment of an airbag through the opening may comprise (a) a substrate comprising a base layer; and (b) a cover comprising a cover layer. The cover layer may comprise an inner surface coupled to the substrate. The cover layer may comprise a recess in the inner surface of the cover layer. The substrate may comprise a projection aligned with the recess in the cover layer. The recess in the inner surface of the cover layer and the projection of the substrate may be configured to facilitate deployment of the airbag through the opening by facilitating formation of the opening through the cover layer. The recess may be formed as an indentation in the inner surface of the cover layer. The projection of the substrate may be in the recess of the cover layer. The projection of the substrate may penetrate the inner surface of the cover layer to form the recess of the cover layer. The cover layer may comprise a molded thermoplastic material; the substrate may comprise a fiber panel. The cover layer may comprise a molded thermoplastic material; the substrate may comprise an injection molded component. The cover layer may comprise a skin material; the substrate may comprise a composite material; the skin material may be softer than the composite material. The cover layer may comprise a skin layer; the projection may comprise a protrusion. The cover layer may be molded on the substrate. The recess may be formed by molding the cover layer on the projection of the substrate. The cover layer may comprise an outer surface opposite the inner surface of the cover layer; the outer surface may comprise a substantially planar surface opposite the recess in the inner surface of the cover layer.

According to an exemplary embodiment as shown schematically in the FIGURES, a component for a vehicle interior formed in a mold and configured to facilitate deployment of an airbag may comprise (a) a substrate comprising a fiber panel; and (b) a cover comprising a skin layer. The skin layer may comprise an inner surface coupled to the substrate. The skin layer may comprise a recess in the inner surface of the skin layer. The substrate may comprise a protrusion aligned with the recess in the skin layer. The substrate may comprise a rear side configured for contact from the airbag to establish an opening for deployment of the airbag. The protrusion of the substrate may be formed by (a) compressing a first portion of the fiber panel between a first surface and a second surface of the mold to a first thickness; and (b) compressing a second portion of the fiber panel between the first surface and the second surface of the mold to a second thickness. The recess of the skin layer may be formed by molding the skin layer on the protrusion of the substrate.

According to an exemplary embodiment as shown schematically in the FIGURES, a method of manufacturing a component for a vehicle interior configured to provide an opening for deployment of an airbag through the opening in a mold may comprise (a) providing a pre-form substrate; (b) disposing the pre-form substrate onto a first surface of the mold; (c) compressing a first portion of the pre-form substrate between the first surface of the mold and a second surface of the mold to form the pre-form substrate into a compression-formed component having a shape corresponding to a first contour of the first surface and a second contour of the second surface; (d) forming a second portion of the pre-form substrate between the first surface of the mold and the second surface of the mold to form a protrusion in the compression-formed component; and (e) molding a skin layer on the compression-formed component. An inner surface of the skin layer may comprise a recess formed by molding the skin layer on the protrusion of the compression-formed component. The recess in the inner surface of the skin layer and the protrusion of the compression-formed component may be configured to facilitate deployment of the airbag through the opening by facilitating formation of the opening through the skin layer. The method may comprise a step of injecting resin into the mold to form a feature on a rear side of the compression-formed component. The step of molding a skin layer on the compression-formed component may comprise molding the skin layer between the compression-formed component and a third surface of the mold. The step of molding a skin layer on the compression-formed component may comprise molding the skin layer on a top surface of the compression-formed component and on an edge of the compression-formed component.

According to an exemplary embodiment as shown schematically in the FIGURES, a method of manufacturing a component for a vehicle interior configured to provide an opening for deployment of an airbag through the opening in a mold may comprise (a) forming a substrate in the mold; and (b) molding a skin layer on the substrate. The substrate may comprise a protrusion. An inner surface of the skin layer may comprise a recess formed by molding the skin layer on the protrusion of the substrate. The step of forming a substrate in the mold may comprise injection molding the substrate. The step of molding a skin layer on the substrate may comprise injection molding a thermoplastic material on the substrate. The thermoplastic material may comprise at least one of (a) a TPE material; (b) a TPV material; (c) a PU material.

Exemplary Embodiments—B

According to an exemplary embodiment as shown schematically in the FIGURES, a component for an interior of a vehicle configured to facilitate formation of an opening for deployment of an airbag into the interior of the vehicle may comprise a composite structure comprising a substrate and a cover. The substrate may comprise a base layer and a feature configured to facilitate formation of the opening through the cover. The cover may comprise a cover layer comprising an inside surface. The cover may be provided over the substrate. The feature of the substrate may be configured to initiate formation of the opening. The inside surface of the cover layer may comprise a feature. The feature of the inside surface of the cover layer may be configured to facilitate formation of the opening through the cover. The cover may be provided over the base layer of the substrate. The substrate may comprise a structural substrate. The feature of the substrate may be configured to initiate formation of the opening in the cover. The feature of the substrate may be configured to initiate formation of the opening in the cover at a feature of the cover layer of the cover. The feature of the substrate may comprise a projection arrangement. The feature of the substrate comprising the projection arrangement may be configured to initiate formation of the opening. The feature of the substrate comprising the projection arrangement may be configured to initiate formation of the opening. The projection arrangement may comprise a projection. The projection arrangement may comprise a protrusion. The projection arrangement may comprise at least one projection. The projection arrangement may comprise at least one protrusion. The projection arrangement may comprise a set of projections. The set of projections may comprise a set of protrusions. The set of projections may comprise a set of nubs. The set of projections may comprise a set of ribs. The set of projections may comprise a set of ridges. The set of projections may comprise a set of connectors. The set of projections may comprise a set of connectors and a set of nubs. The set of projections may comprise a set of connectors connecting a set of nubs. The base layer may comprise a material; the projection arrangement may comprise a set of projections formed from the material. The projection arrangement may comprise a set of projections integrally formed with the base layer. The projection arrangement may comprise a tear line. The projection arrangement may comprise a seam; the seam may comprise a tear line. The projection arrangement may comprise projections configured to project from the base layer toward the cover. The projection arrangement may comprise projections configured to project from the base layer into the cover. The cover may comprise a set of cavities aligned with a set of projections of the substrate. The set of projections of the substrate may be configured to fit within the set of cavities of the cover. The inside surface of the cover layer may comprise a set of cavities aligned with a set of projections of the base layer of the substrate. The set of projections of the base layer of the substrate may be configured to fit within the set of cavities of the inside surface of the cover layer. The set of projections may comprise a set of segments. The set of segments may comprise a set of nubs. The set of segments may comprise a set of nubs and a set of connectors. The set of segments may comprise a set of nubs and a set of ribs. The set of ribs may comprise a set of connectors. The set of connectors may be configured to connect the set of nubs. The set of ribs may be configured to connect the set of nubs. The set of segments may comprise a set of seams. The feature of the substrate may comprise an initiator for formation of the opening for deployment of the airbag. The initiator may comprise a center segment. The initiator may comprise a center segment and may be configured to form a set of lateral segments. The initiator may comprise a center segment configured to initiate the opening. The initiator may comprise a center segment configured to initiate the opening and a set of lateral segments configured to complete the opening. The initiator may be configured to facilitate formation of the opening within the composite structure. The initiator may be configured to facilitate formation of the opening by creation of a set of airbag doors in the composite structure. The initiator may be configured to facilitate formation of the opening in the composite structure from a center segment. The initiator may be configured to facilitate formation of a set of airbag doors in the composite structure from the center segment through a set of lateral segments. The initiator may comprise a seam providing a tear line through the cover of the composite structure. The initiator may comprise a seam providing a tear line through the cover. The seam may comprise a H-shaped line. The seam may comprise a U-shaped line. The seam may comprise a central section. The central section may comprise a line comprising a curve. The central section may comprise a line with a curved segment. The central section may comprise a line comprising a curved segment. The cover may comprise a feature comprising an initiator configured to provide for formation of the opening for deployment of the airbag. The feature of the substrate and the feature of the cover may together facilitate formation of the opening for deployment of the airbag. The feature of the substrate and the feature of the cover may together facilitate formation of the opening for deployment of the airbag; the feature may comprise an initiator of formation of the opening at the cover. The feature of the substrate may comprise a set of nubs. The cover may be formed over the substrate. The cover may be molded onto the substrate. The cover may be formed over the base layer of the substrate. The cover may be molded onto the base layer of the substrate. The feature of the cover comprising the initiator may comprise a recess. The feature of the cover comprising the initiator may comprise at least one recess. The feature of the cover comprising the initiator comprising the initiator may be formed by the feature of the substrate when the cover is formed onto the substrate. The feature of the substrate may comprise a projection arrangement in the base layer. The feature of the cover comprising the initiator may comprise a recess in the cover layer. The feature of the substrate comprising the projection arrangement in the base layer may be configured to initiate formation of the opening in the cover at the feature comprising the recess in the cover layer of the cover. The feature of the substrate may comprise a projection within the feature of the inside surface of the cover layer of the cover. The projection may comprise a projection arrangement. The projection arrangement may comprise a pattern. The pattern may comprise a set of segments. The pattern may comprise a line. The pattern may comprise a curved line. The pattern may comprise a straight line. The pattern may comprise a set of lines. The pattern may comprise an H-shaped pattern. The pattern may comprise a U-shaped pattern. The pattern may comprise a dotted-line pattern. The pattern may comprise a dotted-line pattern formed by a set of projections. The pattern may comprise a dotted-line pattern formed by a set of nubs. The pattern may comprise a center segment. The pattern may comprise a center segment and a set of lateral segments. The pattern may be configured to form an airbag door. The pattern may be configured to form a set of airbag doors. The projection arrangement may comprise a pattern of projections. The pattern of projections may comprise a set of nubs. The pattern of projections may comprise the set of nubs and a set of connectors. The pattern of projections may comprise the set of nubs and a set of connectors between each of a selected set of nubs. The pattern of projections may comprise the set of nubs and a set of connectors between each set of nubs. The set of connectors may comprise a set of ribs. A feature of the inside surface of the cover layer of the cover may comprise a recess configured to facilitate formation of the opening through the cover. The feature of the inside surface of the cover may comprise a recess configured for the feature of the substrate configured to facilitate formation of the opening. The feature of the inside surface of the cover may comprise a recess configured to initiate formation of the opening through the cover. The cover may comprise a feature configured to initiate formation of the opening through the cover for deployment of the airbag into the interior of the vehicle. The feature may comprise a projection with a profile. The profile may comprise a curved shape. The base layer of the substrate may comprise a fiber panel. The fiber panel may comprise a generally rigid fiber panel. The feature of the substrate may comprise a generally rigid projection. The base layer of the substrate may comprise a compressed fiber panel comprising the feature. The feature may comprise a generally rigid projection. The feature may comprise a generally rigid projection formed in the compressed fiber panel. The feature may comprise a generally rigid projection formed on the compressed fiber panel. The panel may comprise a compressed fiber panel. The feature may comprise a projection formed on the compressed fiber panel. The feature may comprise a projection integrally-formed on the compressed fiber panel. The feature may comprise a projection molded on the compressed fiber panel. The feature may comprise a projection injection-molded on the compressed fiber panel. The feature may comprise a projection comprising a set of nubs molded on the compressed fiber panel. The feature may comprise a projection comprising a set of nubs injection-molded on the compressed fiber panel. The feature may comprise a projection comprising a set of nubs formed of a resin on the compressed fiber panel. The base layer may comprise an upper surface providing the feature and a lower surface comprising a recess. The base layer may comprise a recess offset from the feature of the substrate. The recess may be configured to facilitate formation of the opening for deployment of the airbag. The cover layer may comprise an inside coupled to the substrate. The cover layer may comprise a recess in the inner surface of the cover layer. The substrate may comprise a projection aligned with the recess in the cover layer. The recess in the inner surface of the cover layer and the projection of the substrate may be configured to facilitate deployment of the airbag through the opening by facilitating formation of the opening through the cover layer. The composite structure may be configured to facilitate formation of an opening for the airbag to facilitate deployment of the airbag. The cover layer may have a nominal thickness in a range of between about 0.7 mm and about 3 mm. The recess in the cover layer may have a nominal depth in a range of between 0.3 mm and 1.5 mm. A nominal residual thickness at the recess of the cover layer may comprise the nominal thickness of the cover layer minus the nominal depth of the recess in the cover layer. The nominal residual thickness at the recess of the cover layer may be in a range of between 0.3 mm and 1.5 mm. A ratio of a nominal thickness of the cover layer and the nominal residual thickness of the recess of the cover layer may be between about 1.5 and 4. The panel may comprise a fiber panel with a nominal thickness of between about 1.0 mm and 2.5 mm. The composite structure may comprise the cover layer formed on the base layer of the substrate. The cover layer of the cover of the composite structure may be configured to provide an exterior surface. The exterior surface of the cover may comprise a decorative effect. The composite structure may comprise the cover layer formed on the base layer of the substrate; the feature of the cover layer of the cover may not be generally visible at the exterior surface of the cover. The composite structure may comprise the cover layer formed on the base layer of the substrate; the feature of the cover layer of the cover may comprise a pattern; the pattern may not be generally visible at the exterior surface of the cover. The composite structure may comprise the cover layer formed on the base layer of the substrate. The composite structure may comprise the cover layer molded on the base layer of the substrate. The recess may be formed as an indentation in the inner surface of the cover layer. The recess may comprise a notch. The projection of the substrate may be in the recess of the cover layer. The projection of the substrate may penetrate the inner surface of the cover layer to form the recess of the cover layer. The projection may comprise an angled surface. The cover layer may be molded on the substrate. The recess may be formed by molding the cover layer on the projection of the substrate. The cover layer may comprise an injection molded thermoplastic material. The cover layer may comprise a generally opaque material. The cover layer may comprise at least one of (a) a TPE material; (b) a TPV material; (c) a PU material. The substrate may comprise at least one feature at the rear side of the substrate adjacent the recess of the skin layer. The at least one feature may comprise at least one of (a) a resin; (b) a thermoplastic resin; (c) polypropylene; (d) acrylonitrile butadiene styrene; (e) polycarbonate. The component may comprise at least one of (a) an instrument panel; (b) a dashboard; (c) a door panel; (d) a steering wheel assembly; (e) a console; (f) a cockpit; (g) a knee bolster; (h) a trim component.

According to an exemplary embodiment as shown schematically in the FIGURES, a component for a vehicle interior configured to provide an opening for deployment of an airbag through the opening may comprise (a) a substrate comprising a base layer; and (b) a cover comprising a cover layer. The cover layer may comprise an inner surface coupled to the substrate. The cover layer may comprise a recess in the inner surface of the cover layer. The substrate may comprise a projection aligned with the recess in the cover layer. The recess in the inner surface of the cover layer and the projection of the substrate may be configured to facilitate deployment of the airbag through the opening by facilitating formation of the opening through the cover layer. The recess may be formed as an indentation in the inner surface of the cover layer. The recess may comprise a notch. The projection of the substrate may be in the recess of the cover layer. The projection of the substrate may penetrate the inner surface of the cover layer to form the recess of the cover layer. The projection may comprise an angled surface. The cover layer may be molded on the substrate. The recess may be formed by molding the cover layer on the projection of the substrate. The cover layer may comprise an injection molded thermoplastic material. The cover layer may comprise a generally opaque material. The cover layer may comprise at least one of (a) a TPE material; (b) a TPV material; (c) a PU material. The cover layer may comprise a skin material; the substrate may comprise a composite material; the skin material may be softer than the composite material. The cover layer may be configured to provide an exterior surface of the component. The cover layer may comprise an outer surface opposite the inner surface of the cover layer; the outer surface may comprise a substantially planar surface opposite the recess in the inner surface of the cover layer. The substrate may comprise a panel comprising fibers. The substrate may comprise a fiber panel. A rear side of the substrate may be configured for contact from the airbag to establish the opening for deployment of the airbag. The rear side of the substrate may be configured to support an airbag module comprising the airbag. The substrate may comprise at least one feature at the rear side of the substrate adjacent the recess of the cover layer. The at least one feature may comprise at least one of (a) a resin; (b) a thermoplastic resin; (c) polypropylene; (d) acrylonitrile butadiene styrene; (e) polycarbonate. The at least one feature may be formed on the rear side of the substrate. The substrate may comprise a recess at the rear side of the substrate adjacent the recess of the cover layer. The recess of the substrate may be configured to facilitate deployment of the airbag through the opening by facilitating formation of the opening through the cover layer. The cover layer may comprise a thermoplastic material; the substrate may comprise a fiber panel; the substrate may comprise at least one feature at the rear side of the substrate formed from the thermoplastic material of the cover layer. The substrate may comprise an injection molded component. The component may comprise at least one of (a) an instrument panel; (b) a dashboard; (c) a door panel; (d) a steering wheel assembly; (e) a console; (f) a cockpit; (g) a knee bolster; (h) a trim component.

According to an exemplary embodiment as shown schematically in the FIGURES, a component for a vehicle interior configured to provide an opening for deployment of an airbag through the opening may comprise (a) a substrate; and (b) a cover comprising a skin layer. The skin layer may comprise an inner surface coupled to the substrate. The skin layer may comprise a recess in the inner surface of the skin layer. The substrate may comprise a protrusion aligned with the recess in the skin layer. The recess in the inner surface of the skin layer and the protrusion of the substrate may be configured to facilitate deployment of the airbag through the opening by facilitating formation of the opening through the skin layer. The recess may be formed as an indentation in the inner surface of the skin layer. The recess may comprise a notch. The protrusion of the substrate may be in the recess of the skin layer. The protrusion of the substrate may penetrate the inner surface of the skin layer to form the recess of the skin layer. The protrusion may comprise an angled surface. The skin layer may be molded on the substrate. The recess may be formed by molding the skin layer on the protrusion of the substrate. The skin layer may comprise an injection molded thermoplastic material. The skin layer may comprise a generally opaque material. The skin layer may comprise at least one of (a) a TPE material; (b) a TPV material; (c) a PU material. The skin layer may comprise a skin material; the substrate may comprise a composite material; the skin material may be softer than the composite material. The skin layer may be configured to provide an exterior surface of the component. The skin layer may comprise an outer surface opposite the inner surface of the skin layer; the outer surface may comprise a substantially planar surface opposite the recess in the inner surface of the skin layer. The substrate may comprise a panel comprising fibers. The substrate may comprise a fiber panel. A rear side of the substrate may be configured for contact from the airbag to establish the opening for deployment of the airbag. The rear side of the substrate may be configured to support an airbag module comprising the airbag. The substrate may comprise at least one feature at the rear side of the substrate adjacent the recess of the skin layer. The at least one feature may comprise at least one of (a) a resin; (b) a thermoplastic resin; (c) polypropylene; (d) acrylonitrile butadiene styrene; (e) polycarbonate. The at least one feature may be formed on the rear side of the substrate. The substrate may comprise a recess at the rear side of the substrate adjacent the recess of the skin layer. The recess of the substrate may be configured to facilitate deployment of the airbag through the opening by facilitating formation of the opening through the skin layer. The skin layer may comprise a thermoplastic material; the substrate may comprise a fiber panel; the substrate may comprise at least one feature at the rear side of the substrate formed from the thermoplastic material of the skin layer. The substrate may comprise an injection molded component. The component may comprise at least one of (a) an instrument panel; (b) a dashboard; (c) a door panel; (d) a steering wheel assembly; (e) a console; (f) a cockpit; (g) a knee bolster; (h) a trim component.

According to an exemplary embodiment as shown schematically in the FIGURES, a component for a vehicle interior formed in a mold and configured to facilitate deployment of an airbag may comprise (a) a substrate comprising a fiber panel; and (b) a cover comprising a skin layer. The skin layer may comprise an inner surface coupled to the substrate. The skin layer may comprise a recess in the inner surface of the skin layer. The substrate may comprise a protrusion aligned with the recess in the skin layer. The substrate may comprise a rear side configured for contact from the airbag to establish an opening for deployment of the airbag. The protrusion of the substrate may be formed by (a) compressing a first portion of the fiber panel between a first surface and a second surface of the mold to a first thickness; and (b) compressing a second portion of the fiber panel between the first surface and the second surface of the mold to a second thickness. The recess of the skin layer may be formed by molding the skin layer on the protrusion of the substrate.

According to an exemplary embodiment as shown schematically in the FIGURES, a method of manufacturing a component for a vehicle interior configured to provide an opening for deployment of an airbag through the opening in a mold may comprise (a) providing a pre-form substrate; (b) disposing the pre-form substrate onto a first surface of the mold; (c) compressing a first portion of the pre-form substrate between the first surface of the mold and a second surface of the mold to form the pre-form substrate into a compression-formed component having a shape corresponding to a first contour of the first surface and a second contour of the second surface; (d) forming a second portion of the pre-form substrate between the first surface of the mold and the second surface of the mold to form a protrusion in the compression-formed component; and (e) molding a skin layer on the compression-formed component. An inner surface of the skin layer may comprise a recess formed by molding the skin layer on the protrusion of the compression-formed component. The recess in the inner surface of the skin layer and the protrusion of the compression-formed component may be configured to facilitate deployment of the airbag through the opening by facilitating formation of the opening through the skin layer. The method may comprise a step of injecting resin into the mold to form a feature on a rear side of the compression-formed component. The step of molding a skin layer on the compression-formed component may comprise molding the skin layer between the compression-formed component and a third surface of the mold. The step of molding a skin layer on the compression-formed component may comprise molding the skin layer on a top surface of the compression-formed component and on an edge of the compression-formed component.

According to an exemplary embodiment as shown schematically in the FIGURES, a method of manufacturing a component for a vehicle interior configured to provide an opening for deployment of an airbag through the opening in a mold may comprise (a) forming a substrate in the mold; (b) molding a skin layer on the substrate. The substrate may comprise a protrusion. An inner surface of the skin layer may comprise a recess formed by molding the skin layer on the protrusion of the substrate. The step of forming a substrate in the mold may comprise injection molding the substrate. The step of molding a skin layer on the substrate may comprise injection molding a thermoplastic material on the substrate. The thermoplastic material may comprise at least one of (a) a TPE material; (b) a TPV material; (c) a PU material.

Exemplary Embodiments—C

As indicated schematically according to an exemplary embodiment in FIGS. 21A-21F, 23A-23H, 25A-25C, 26A-26D, 27A-27B, 28A-28B, 34A-34F, 36A-36F, 37A-37C and 38A-38D, the feature shown as projection PN in the base layer of the panel/substrate CF/SB and the feature shown as recess RS in the cover layer of cover T may be configured in a variety of shapes and dimensions/thicknesses.

As indicated schematically according to an exemplary embodiment, the cover layer of the cover of the composite structure may comprise a skin layer and may have a nominal thickness tT in a range of between about 0.7 mm and about 3 mm; the recess in the cover layer may have a nominal depth in a range of between 0.3 mm and 1.5 mm; a nominal residual thickness tR at the recess of the cover layer may comprise the nominal thickness of the cover layer minus the nominal depth of the recess in the cover layer; the nominal residual thickness at the recess of the cover layer may be in a range of between 0.3 mm and 1.5 mm; a ratio of a nominal thickness of the cover layer and the nominal residual thickness of the recess of the cover layer may be between about 1.5 and 4.

As indicated schematically according to an exemplary embodiment, the cover layer of the cover of the composite structure may comprise a skin layer and may have a nominal thickness tT in a range of between 0.7 mm and 1.5 mm; the recess in the cover layer may have a nominal depth in a range of between 0.3 mm and 1.0 mm; a nominal residual thickness tR at the recess of the cover layer may comprise the nominal thickness of the cover layer minus the nominal depth of the recess in the cover layer; the nominal residual thickness at the recess of the cover layer may be in a range of between 0.4 mm and 1.2 mm; a ratio of a nominal thickness of the cover layer and the nominal residual thickness of the recess of the cover layer may be between about 1.5 and 3.5. As indicated schematically according to an exemplary embodiment, the cover layer of the cover of the composite structure may comprise a skin layer and may have a nominal thickness tT in a range of about 1.0 mm to 1.2 mm; the recess in the cover layer may have a nominal depth in a range of between 0.4 mm and 0.7 mm; a nominal residual thickness tR at the recess of the cover layer may comprise the nominal thickness of the cover layer minus the nominal depth of the recess in the cover layer; the nominal residual thickness at the recess of the cover layer may be in a range of between 0.4 mm and 0.7 mm; a ratio of a nominal thickness of the cover layer and the nominal residual thickness of the recess of the cover layer may be between about 1.5 and 2.5.

As indicated schematically according to an exemplary embodiment, the cover layer of the composite structure may comprise a foam material with a nominal thickness tT in a range of between 1.5 mm and 4.0 mm; the recess in the cover layer may have a nominal depth in a range of between 0.3 mm and 1.5 mm; a nominal residual thickness tR at the recess of the cover layer may comprise the nominal thickness of the cover layer minus the nominal depth of the recess in the cover layer; the nominal residual thickness at the recess of the cover layer may be in a range of between 0.6 mm and 2.5 mm; a ratio of a nominal thickness of the cover layer and the nominal residual thickness of the recess of the cover layer may be between about 1.5 and 5.0. As indicated schematically according to an exemplary embodiment, the cover layer of the composite structure may comprise a foam material with a nominal thickness tT in a range of about 2.7 mm to 3.3 mm; the recess in the cover layer may have a nominal depth in a range of between 0.4 mm and 1.0 mm; a nominal residual thickness tR at the recess of the cover layer may comprise the nominal thickness of the cover layer minus the nominal depth of the recess in the cover layer; the nominal residual thickness at the recess of the cover layer may be in a range of between 0.4 mm and 2.5 mm.

As indicated schematically according to an exemplary embodiment, the panel/substrate of the composite structure may comprise a fiber panel with a nominal thickness of between about 1.5 mm and 1.7 mm; the fiber panel may have a nominal thickness of between about 1.5 mm and 1.7 mm. The panel may comprise a fiber panel with a nominal thickness of between about 1.0 mm and 2.5 mm. The panel/substrate may comprise a fiber mat of a thickness tM compressed to a preform panel of a thickness tP; the preform panel may be treated/compressed into a generally rigid compressed fiber panel providing the panel/substrate having the nominal thickness for the composite structure.

As indicated schematically according to an exemplary embodiment in FIGS. 2A-2G, 3A-3F, 4A-4F, 5A-5G, 20A-20B and 24A-24C, the features FT in the cover T and substrate SB of composite structure of the component C providing for deployment of the airbag may be configured with dimensions/thickness of materials and arrangement of features in a manner to provide an exterior surface with an airbag exit area ABX at which the seam/tear line for the opening may not be readily visible (until deployment of the airbag through formation of the opening) and to facilitate efficient formation of the opening at the seam/tear line for deployment of the airbag through the cover T and substrate SB of the composite structure. See also FIGS. 2B-2G, 3A-3F, 4A-4F and 5A-5G, 25A-25C, 26A-26D, 27A-27B, 28A-28B, 32A-32C, 33A-33C and 39A-39C.

Exemplary Embodiments—D

Figures 1A, 1B, 2A, 2B, 2C, 2D, 2E, 2F, 2G:
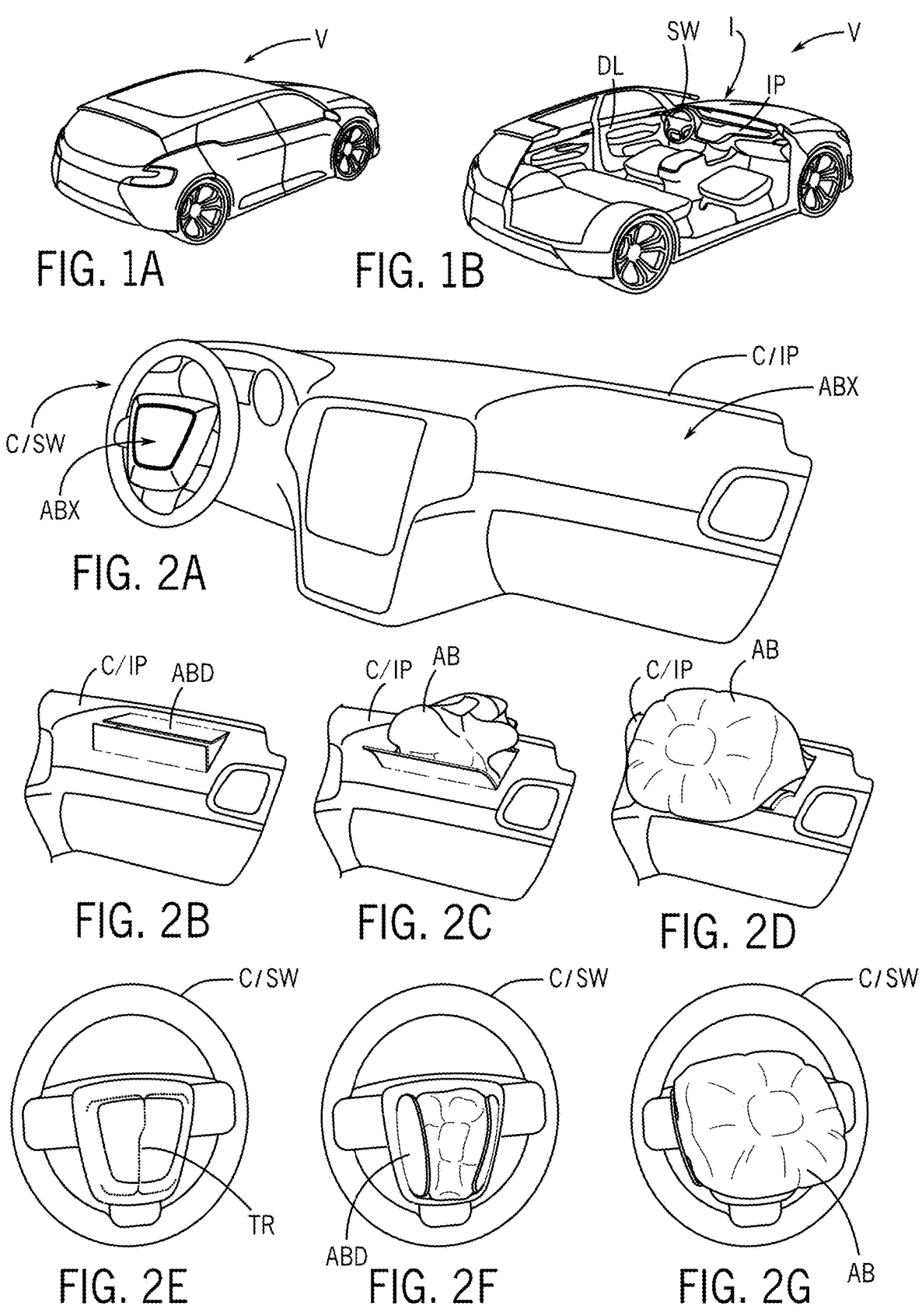
FIG. 1A is a schematic perspective view of a vehicle according to an exemplary embodiment.
FIG. 1B is a schematic perspective cut-away view of a vehicle showing a vehicle interior according to an exemplary embodiment.
FIG. 2A is a schematic perspective view of a component for a vehicle interior shown as an instrument panel according to an exemplary embodiment.
FIGS. 2B through 2D are schematic perspective views of a deployment of an airbag from a vehicle interior component according to an exemplary embodiment.
FIGS. 2E through 2G are schematic perspective views of a deployment of an airbag from a vehicle interior component according to an exemplary embodiment.
Figures 3A, 3B, 3C, 3D, 3E, 3F, 4A, 4B, 4C, 4D, 4E, 4F:
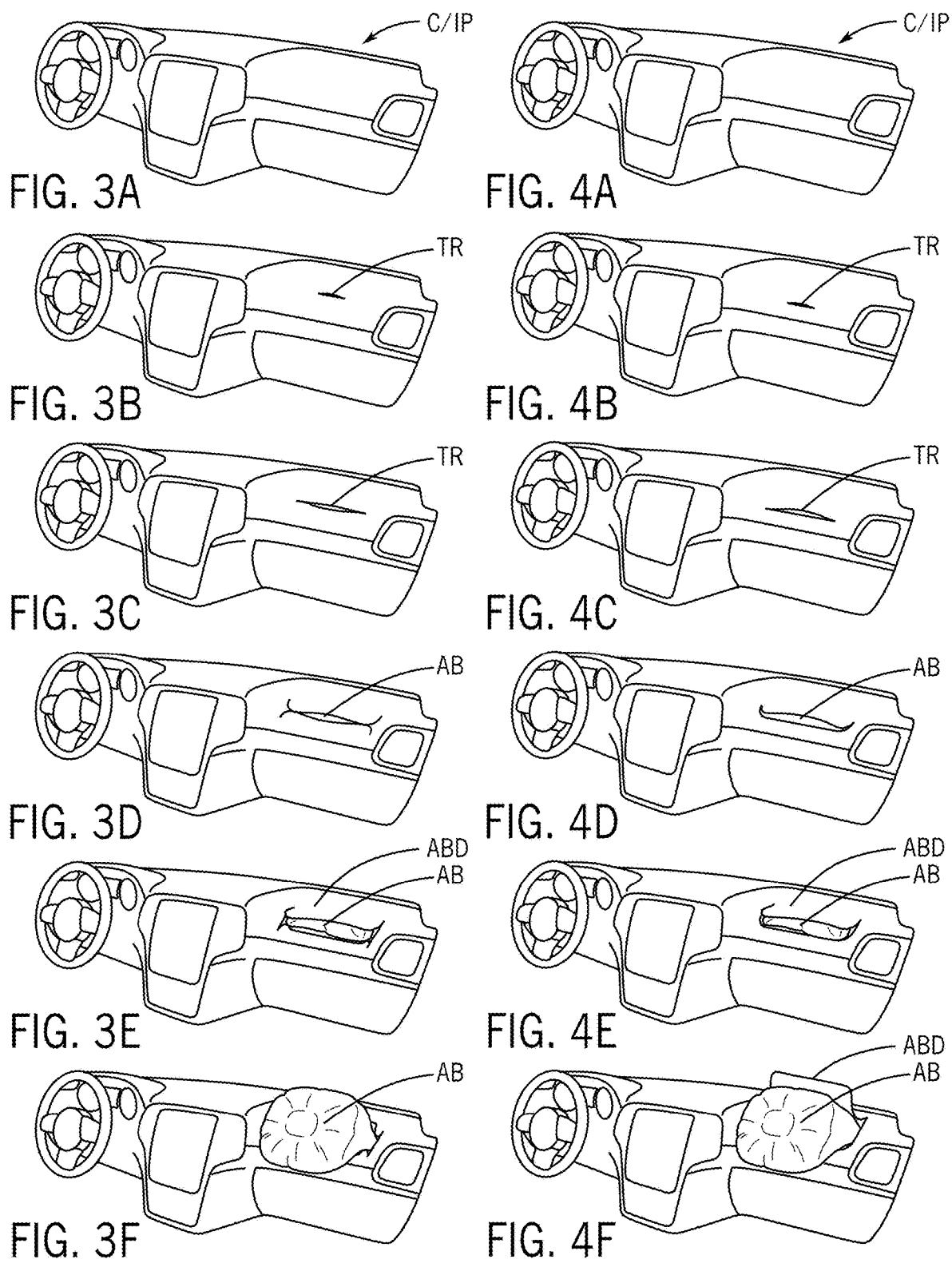
FIGS. 3A through 3F are schematic perspective views of a deployment of an airbag from a vehicle interior component according to an exemplary embodiment.
FIGS. 4A through 4F are schematic perspective views of a deployment of an airbag from a vehicle interior component according to an exemplary embodiment.
Figures 5A, 5B, 5C, 5D, 5E, 5F, 5G:
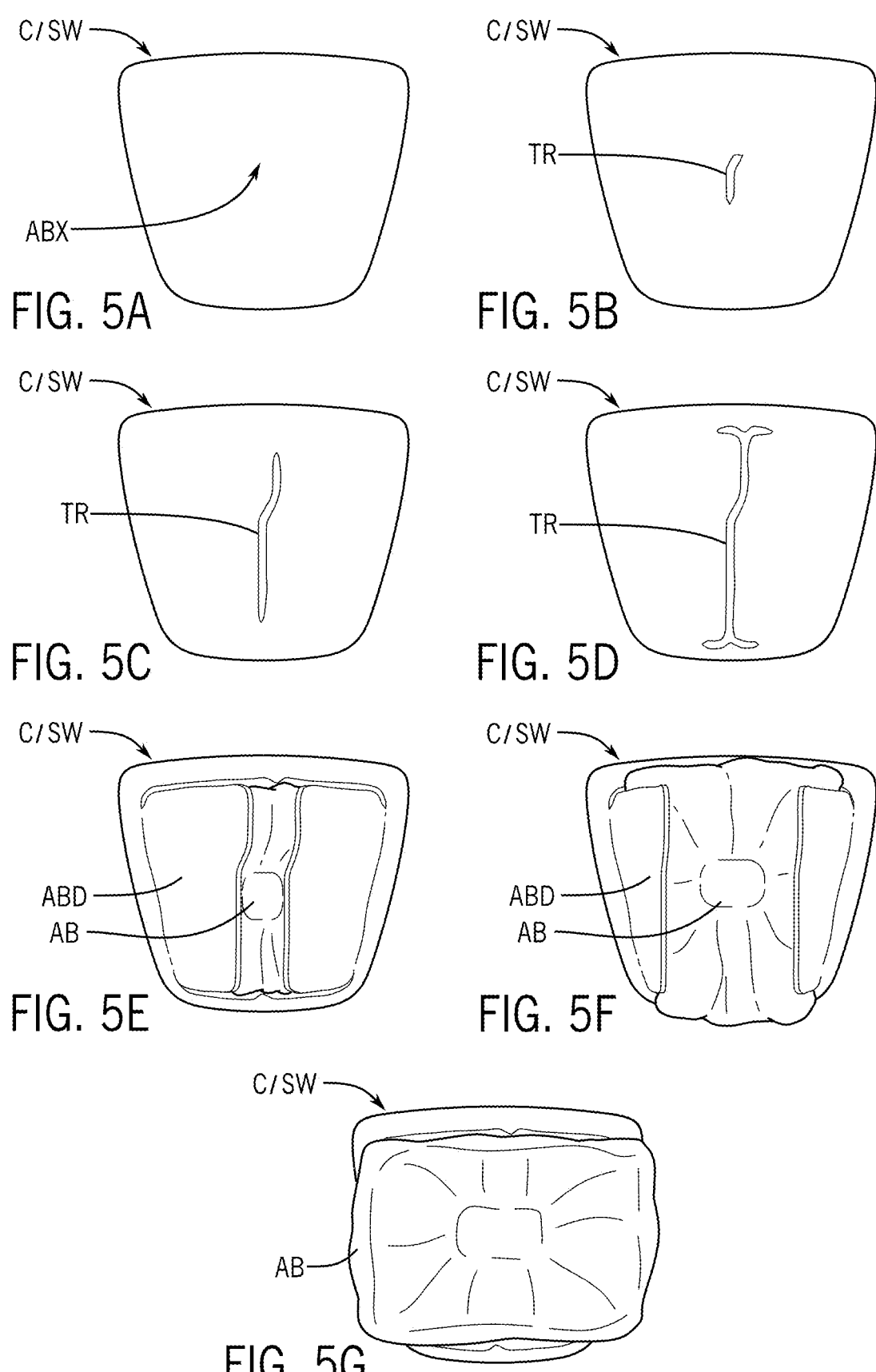
FIGS. 5A through 5G are schematic perspective views of a deployment of an airbag from a vehicle interior component according to an exemplary embodiment.
Figures 6A, 6B:
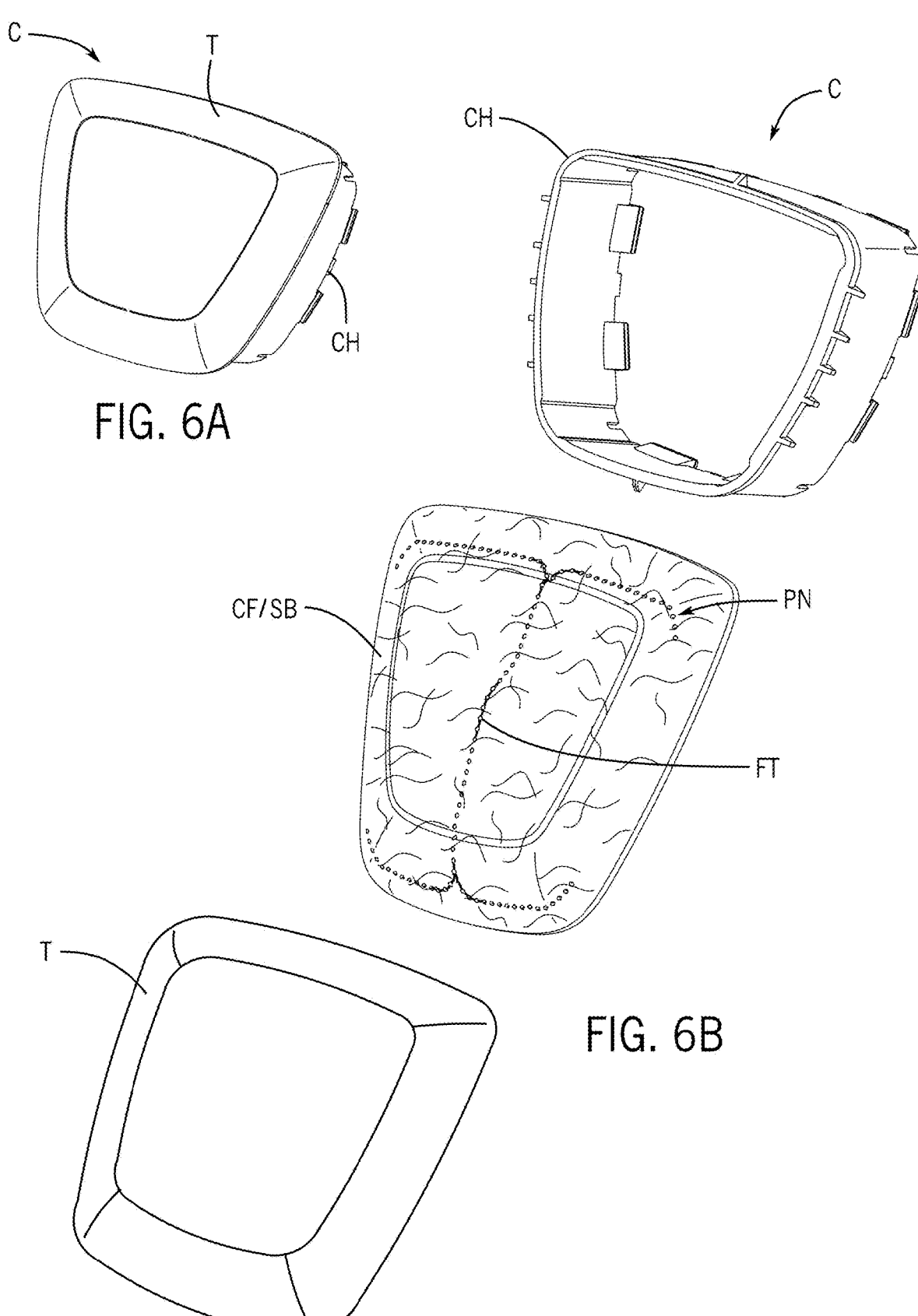
FIG. 6A is a schematic perspective view of a component for a vehicle interior according to an exemplary embodiment.
FIG. 6B is a schematic exploded perspective view of a component for a vehicle interior according to an exemplary embodiment.
Figures 7A, 7B:
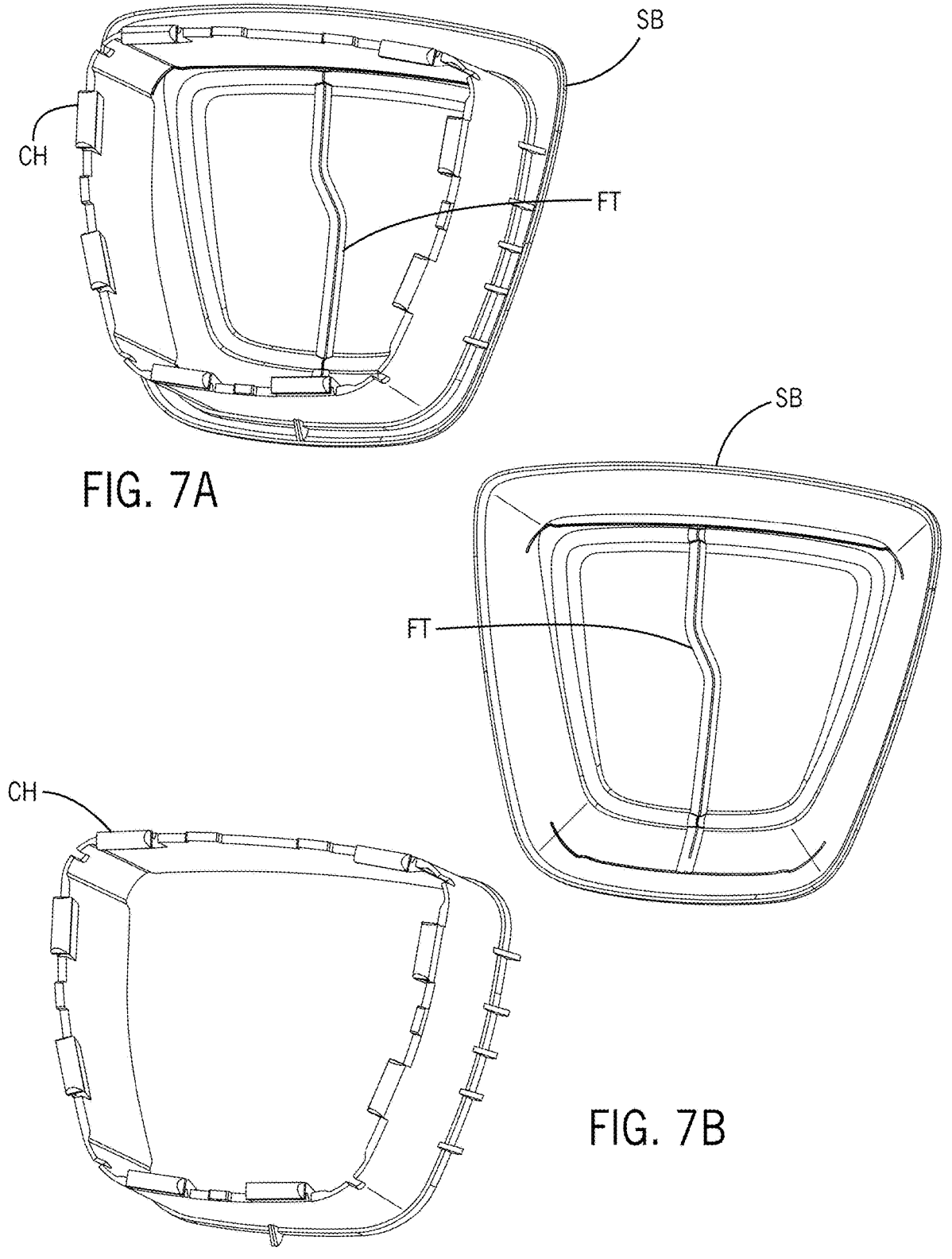
FIG. 7A is a schematic perspective view of a component for a vehicle interior according to an exemplary embodiment.
FIG. 7B is a schematic exploded perspective view of a component for a vehicle interior according to an exemplary embodiment.
Figures 8, 9, 10:
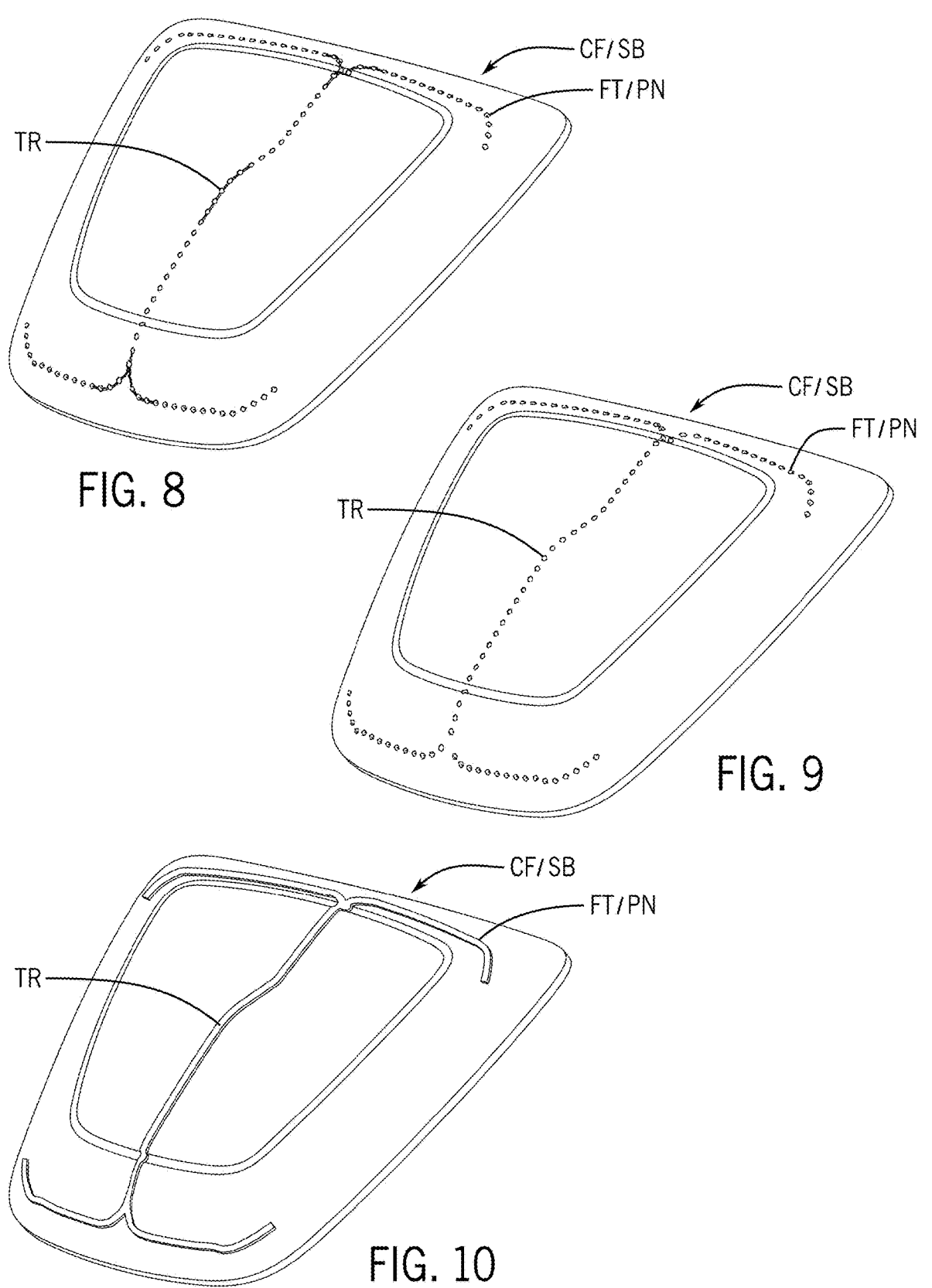
FIG. 8 is a schematic perspective view of a substrate of a component for a vehicle interior according to an exemplary embodiment.
FIG. 9 is a schematic perspective view of a substrate of a component for a vehicle interior according to an exemplary embodiment.
FIG. 10 is a schematic perspective view of a substrate of a component for a vehicle interior according to an exemplary embodiment.

Referring to FIGS. 1A and 1B, a vehicle V is shown including an interior I with an instrument panel IP and doors DL. According to an exemplary embodiment, interior components of vehicle V such as instrument panel IP and doors/door panel DL may include trim panels. According to an exemplary embodiment, components such as instrument panel IP and doors DL (and other trim components) may provide visible surfaces in the vehicle interior of vehicle V. According to an exemplary embodiment, instrument panel IP and/or doors DL may provide at least one airbag (e.g. configured to deploy from an airbag module) that may be installed behind/within interior components such as instrument panel IP and/or doors DL. See FIG. 2A.

As indicated schematically according to an exemplary embodiment in FIG. 2A, the cover/surface of the component such as instrument panel IP may be configured to provide an area to provide an opening/door for deployment of the airbag (e.g. from an airbag module); the cover of the component may comprise a weakened line/area to facilitate formation of the opening/door shown as airbag door ABD through which the airbag AB may deploy (e.g. where the airbag will break through the cover of the component/panel during airbag deployment as intended). As indicated schematically in FIGS. 3A-3F and 4A-4F, component C shown as instrument panel IP may provide a cover with a seam shown as tear line TR through which the airbag AB may progressively develop an opening at the tear line TR to provide the airbag door ABD and through which opening the airbag AB may deploy into the vehicle interior. As indicated schematically in FIGS. 3A-3F, tear line TR may comprise an H shape. As indicated schematically in FIGS. 4A-4F, tear line TR may comprise a U shape.

Figures 23A, 23B, 23C, 23D, 23E, 23F, 23G, 23H:
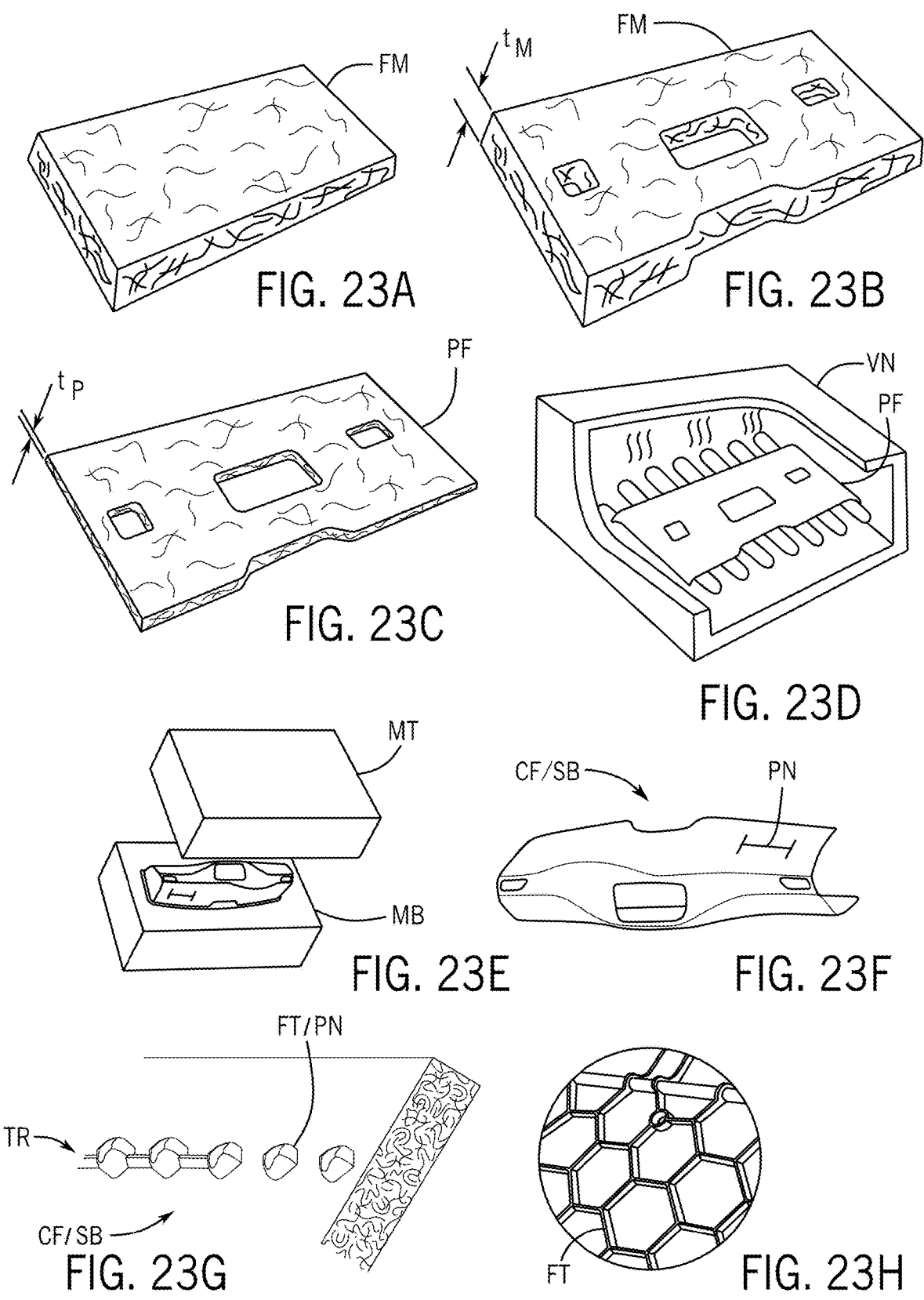
FIGS. 23A to 23C are schematic perspective views of a fiber mat being cut and compressed into a pre-form according to an exemplary embodiment.
FIGS. 23D to 23F are schematic perspective views of a pre-form being formed into a component for a vehicle interior according to an exemplary embodiment.
FIG. 23G is a schematic partial section perspective view of a substrate of a component for a vehicle interior according to an exemplary embodiment.
FIG. 23H is a schematic cutaway perspective view of a substrate of a component for a vehicle interior according to an exemplary embodiment.

According to an exemplary embodiment as shown schematically in FIG. 23A, a fiber mat FM may include a combination of fibers (e.g. natural and/or synthetic fibers) and thermoplastic resin (e.g. polypropylene (PP), acrylonitrile butadiene styrene (ABS), polycarbonate (PC), etc.). According to an exemplary embodiment as shown schematically in FIG. 23B, fiber mat FM may be trimmed. According to an exemplary embodiment, fiber mat FM may have a thickness tM. According to an exemplary embodiment, fiber mat FM may be heated to induce the thermoplastic resin to liquefy. According to an exemplary embodiment as shown schematically in FIG. 23C, fiber mat FM may be heated and partially compressed into a pre-form PF. According to an exemplary embodiment, fiber mat FM may be placed into a low-temperature mold and compression molded into a desired shape. According to an exemplary embodiment, as the compressed fiber mat cools, the thermoplastic within the fiber mat may solidify to establish a substantially rigid composite panel. According to an exemplary embodiment, the pre-form may have a thickness tP, which may be smaller than thickness tM.

According to an exemplary embodiment, fiber mat FM may comprise a combination of structural fibers and thermoset resin (e.g. epoxy, polyester, etc.). According to an exemplary embodiment, fiber mat FM may be compressed within a heated mold to form a partially compressed fiber mat with a desired shape and to induce curing of the thermoset resin. According to an exemplary embodiment, a substantially rigid composite panel may be formed after the thermoset resin is cured.

According to an exemplary embodiment as shown schematically in FIG. 23D, pre-form PF comprising a compressed fiber mat may be heated in an oven VN. As shown schematically in FIG. 23E, the heated pre-form may be transferred into a mold having a mold top MT and a mold bottom MB. According to an exemplary embodiment as shown schematically in FIG. 23F, a compression-formed component CF shown as an instrument panel substrate SB may be produced by a process of compression forming pre-form PF. The process may comprise compression forming. The process may also comprise injection molding. According to an exemplary embodiment, heated pre-form may be further compressed into a fiber panel; plastic resin may be injected on the back side of fiber panel to form an ancillary feature. According to an exemplary embodiment as shown schematically in FIG. 23F, compression-formed component CF may comprise a protrusion PN configured to facilitate airbag deployment. According to an exemplary embodiment as shown schematically in FIG. 23H, compression-formed component CF may provide ancillary features FT shown as plastic ribs on the backside of compression-formed component CF to improve structural integrity and rigidity. According to an exemplary embodiment, compression-formed component CF may be configured to support an airbag chute (i.e. airbag module) and/or an airbag. According to an exemplary embodiment, a plastic rib may be placed at any location on the backside of compression-formed component CF (e.g. along an edge, in the middle, etc.). According to an exemplary embodiment, multiple plastic ribs may be placed at various different locations on the backside of compression-formed component CF.

Figure 24A:
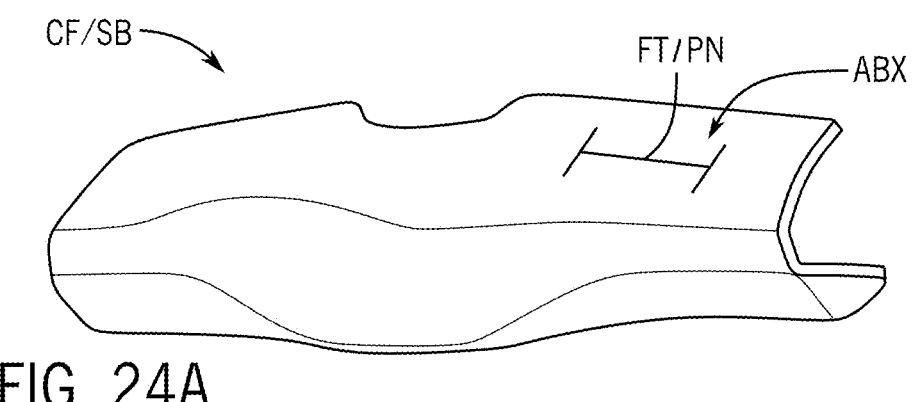
FIGS. 24A to 24B are schematic perspective views of a process to form a component for a vehicle interior according to an exemplary embodiment.
Figure 24B:
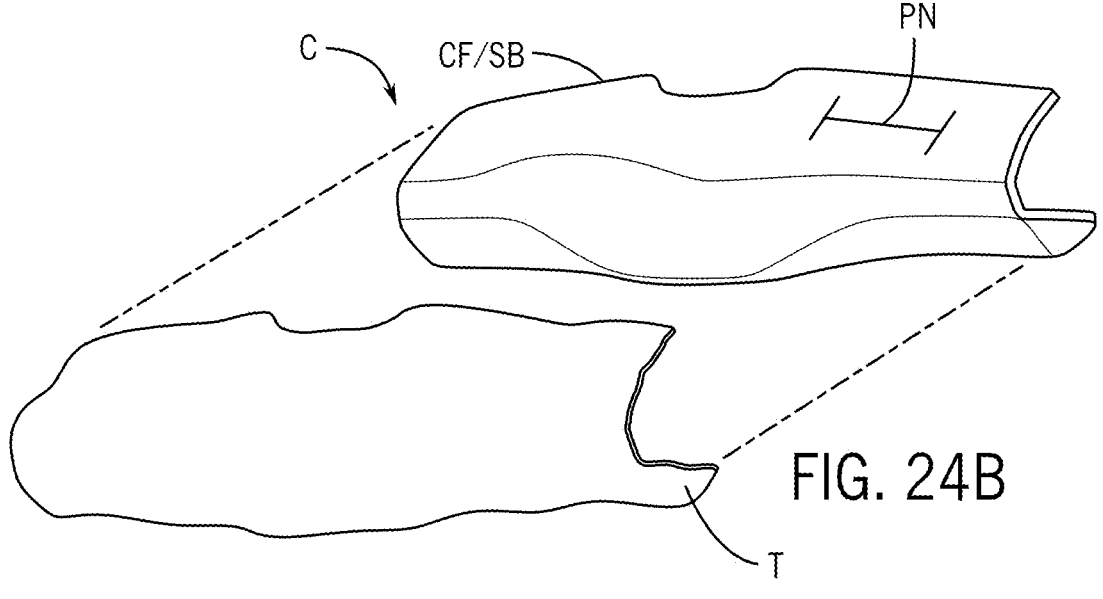
Figure 24C:
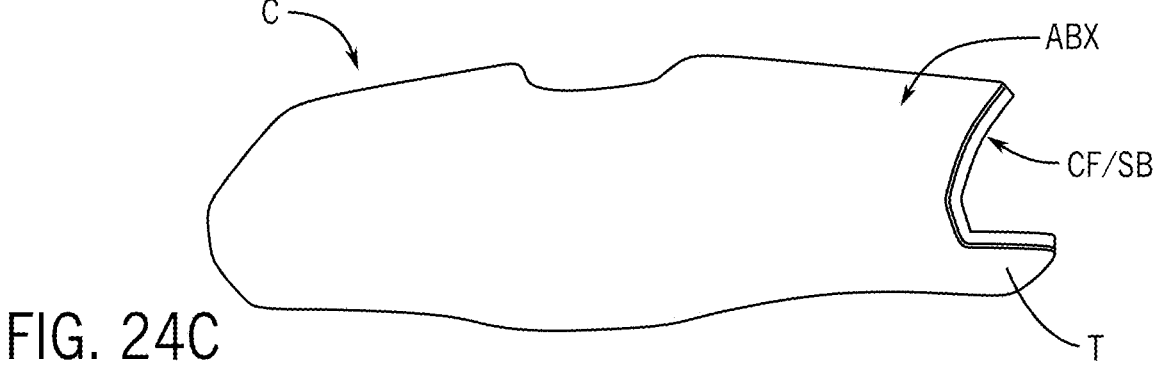
FIG. 24C is a schematic perspective view of a component for a vehicle interior according to an exemplary embodiment.
Figures 25A, 25B, 25C, 26A, 26B, 26C, 26D:
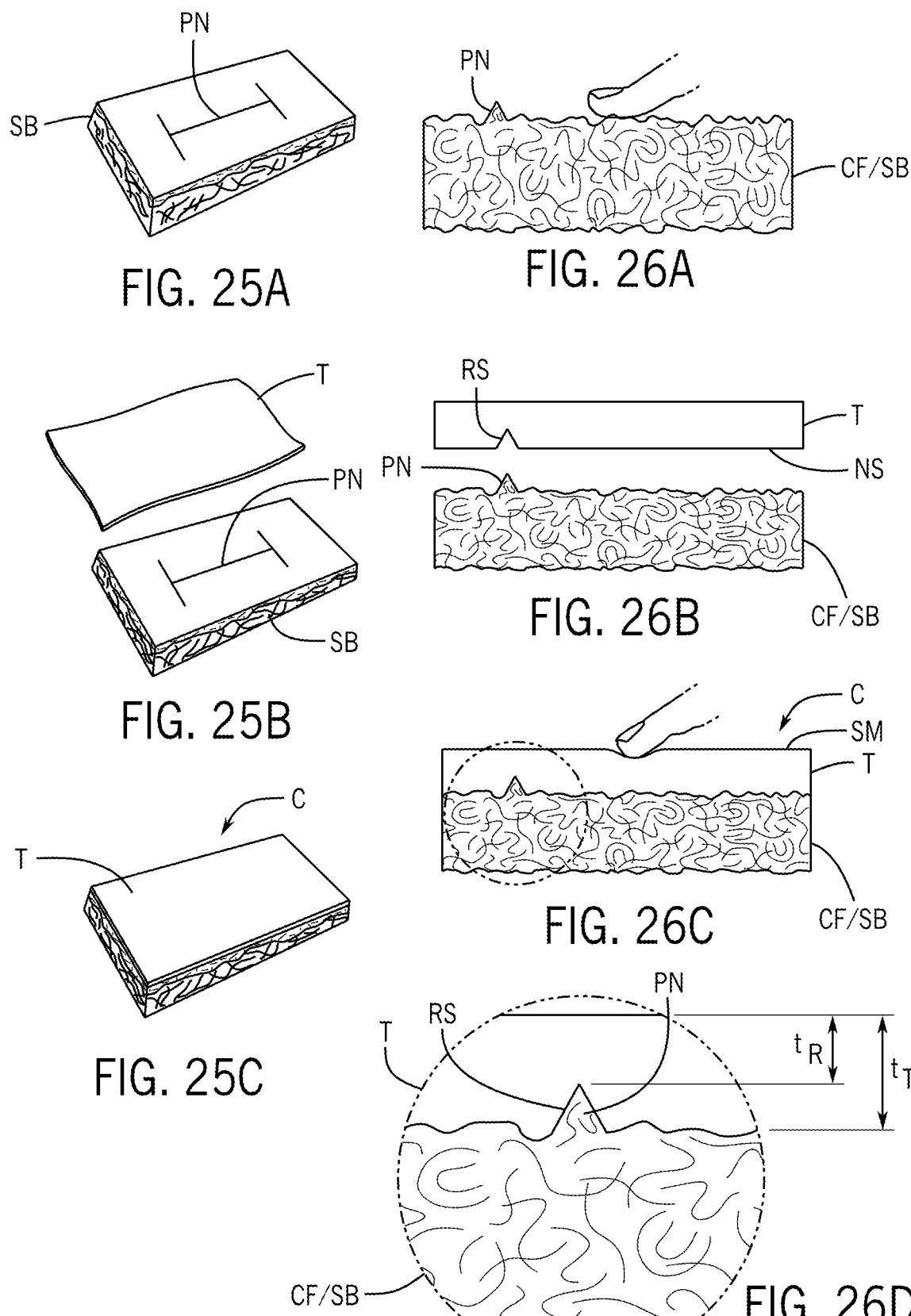
FIGS. 25A to 25C are schematic perspective views of a process to form a component for a vehicle interior according to an exemplary embodiment.
FIGS. 26A to 26D are schematic partial section views of a process to form a component for a vehicle interior according to an exemplary embodiment.

As shown schematically in FIG. 24A, a compression-formed component CF shown as substrate SB or carrier (e.g. for an instrument panel) may be produced by a process of compression forming. According to an exemplary embodiment, pre-form PF may be compressed and/or formed to form compression-formed component CF. Plastic resin may be injected on compression-formed component CF to form compression-formed component CF comprising features. Compression-formed component CF may comprise a protrusion PN extending from a top surface of compression-formed component CF. As shown schematically in FIG. 24B, a cover/cover layer T may be applied to compression-formed component CF. As shown schematically in FIG. 7C, component C may provide a surface effect comprising a generally smooth surface and a generally soft form (e.g. from the cover T).

Referring to FIGS. 25A-25C and 26A-26D, construction/formation of a component C is shown schematically according to an exemplary embodiment. A compression-formed component may be formed by compression forming a fiber mat. As shown schematically in FIG. 26A, the compression-formed component may provide a surface effect comprising a generally rigid form. As shown schematically in FIGS. 25B-25C and 26B-26D, the compression-formed component may be covered with a cover T; as shown schematically in FIGS. 25C and 26C, the component may provide a surface effect comprising a generally smooth surface SM and a generally soft form (e.g. from the cover T).

According to an exemplary embodiment as shown schematically in the FIGURES, a component C for a vehicle interior configured to provide an opening for deployment of an airbag AB through the opening may comprise a substrate SB and a cover T comprising a skin layer. The skin layer may comprise an inner surface coupled to the substrate. The skin layer may comprise a recess RS in the inner surface of the skin layer. The substrate may comprise a protrusion PN aligned with the recess in the skin layer. The recess in the inner surface of the skin layer and the protrusion of the substrate may be configured to facilitate deployment of the airbag through the opening by facilitating formation of the opening through the skin layer. The recess may be formed as an indentation in the inner surface of the skin layer. The recess may comprise a notch. The protrusion of the substrate may be in the recess of the skin layer. The protrusion of the substrate may penetrate the inner surface of the skin layer to form the recess of the skin layer. The protrusion may comprise an angled surface. The skin layer may be molded on the substrate. The recess may be formed by molding the skin layer on the protrusion of the substrate. The skin layer may comprise an injection molded thermoplastic material. The skin layer may comprise a generally opaque material. The skin layer may comprise at least one of (a) a TPE material; (b) a TPV material; (c) a PU material. The skin layer may comprise a skin material; the substrate may comprise a composite material; the skin material may be softer than the composite material. The skin layer may be configured to provide an exterior surface of the component. The skin layer may comprise an outer surface opposite the inner surface of the skin layer; the outer surface may comprise a substantially planar surface opposite the recess in the inner surface of the skin layer. The substrate may comprise a panel comprising fibers. The substrate may comprise a fiber panel. A rear side of the substrate may be configured for contact from the airbag to establish the opening for deployment of the airbag. The rear side of the substrate may be configured to support an airbag module comprising the airbag. The substrate may comprise at least one feature FT at the rear side of the substrate adjacent the recess of the skin layer. The at least one feature may comprise at least one of (a) a resin; (b) a thermoplastic resin; (c) polypropylene; (d) acrylonitrile butadiene styrene; (e) polycarbonate. The at least one feature may be formed on the rear side of the substrate. The substrate may comprise a recess RS at the rear side of the substrate adjacent the recess of the skin layer. The recess of the substrate may be configured to facilitate deployment of the airbag through the opening by facilitating formation of the opening through the skin layer. The skin layer may comprise a thermoplastic material; the substrate may comprise a fiber panel; the substrate may comprise at least one feature FT at the rear side of the substrate formed from the thermoplastic material of the skin layer. The substrate may comprise an injection molded component. The component may comprise at least one of (a) an instrument panel; (b) a dashboard; (c) a door panel; (d) a steering wheel assembly; (e) a console; (f) a cockpit; (g) a knee bolster; (h) a trim component.

According to an exemplary embodiment as shown schematically in the FIGURES, a component C for a vehicle interior formed in a mold and configured to facilitate deployment of an airbag AB may comprise a substrate SB comprising a fiber panel and a cover T comprising a skin layer. The skin layer may comprise an inner surface coupled to the substrate. The skin layer may comprise a recess RS in the inner surface of the skin layer. The substrate may comprise a protrusion PN aligned with the recess in the skin layer. The substrate may comprise a rear side configured for contact from the airbag to establish an opening for deployment of the airbag. The protrusion of the substrate may be formed by (a) compressing a first portion of the fiber panel between a first surface and a second surface of the mold to a first thickness; and (b) compressing a second portion of the fiber panel between the first surface and the second surface of the mold to a second thickness. The recess of the skin layer may be formed by molding the skin layer on the protrusion of the substrate.

According to an exemplary embodiment as shown schematically in the FIGURES, a method of manufacturing a component C for a vehicle interior configured to provide an opening for deployment of an airbag AB through the opening in a mold may comprise (a) providing a pre-form substrate PF; (b) disposing the pre-form substrate onto a first surface of the mold; (c) compressing a first portion of the pre-form substrate between the first surface of the mold and a second surface of the mold to form the pre-form substrate into a compression-formed component CF having a shape corresponding to a first contour of the first surface and a second contour of the second surface; (d) forming a second portion of the pre-form substrate between the first surface of the mold and the second surface of the mold to form a protrusion PN in the compression-formed component; and (e) molding a cover T comprising a skin layer on the compression-formed component. An inner surface of the skin layer may comprise a recess RS formed by molding the skin layer on the protrusion of the compression-formed component. The recess in the inner surface of the skin layer and the protrusion of the compression-formed component may be configured to facilitate deployment of the airbag through the opening by facilitating formation of the opening through the skin layer. The method may comprise a step of injecting resin into the mold to form a feature FT on a rear side of the compression-formed component. The step of molding a skin layer on the compression-formed component may comprise molding the skin layer between the compression-formed component and a third surface of the mold. The step of molding a skin layer on the compression-formed component may comprise molding the skin layer on a top surface of the compression-formed component and on an edge of the compression-formed component.

According to an exemplary embodiment as shown schematically in the FIGURES, a method of manufacturing a component C for a vehicle interior configured to provide an opening for deployment of an airbag AB through the opening in a mold may comprise forming a substrate SB in the mold and molding a cover T comprising a skin layer on the substrate. The substrate may comprise a protrusion PN. An inner surface of the skin layer may comprise a recess RS formed by molding the skin layer on the protrusion of the substrate. The step of forming a substrate in the mold may comprise injection molding the substrate. The step of molding a skin layer on the substrate may comprise injection molding a thermoplastic material on the substrate. The thermoplastic material may comprise at least one of (a) a TPE material; (b) a TPV material; (c) a PU material.

Referring to FIGS. 37A-37C and 38A-38D, construction/formation of a component C is shown schematically according to an exemplary embodiment. As shown schematically in FIGS. 37A and 38A, a substrate SB comprising an injection-molded component PL may provide a surface effect comprising a generally rigid form. As shown schematically in FIGS. 37B-37C and 38B-38D, the injection-molded component may be covered with a cover T; as shown schematically in FIGS. 37C and 38C, the component may provide a surface effect comprising a generally smooth surface SM and a generally soft form (e.g. from the cover T).

According to an exemplary embodiment as shown schematically in FIGS. 37A-37C, 38A-38D and 39A-39C, a component C for a vehicle interior configured to provide an opening for deployment of an airbag AB through the opening may comprise a substrate SB and a cover T comprising a skin layer. The skin layer may comprise an inner surface coupled to the substrate. The skin layer may comprise a recess RS in the inner surface of the skin layer. The substrate may comprise a protrusion PN aligned with the recess in the skin layer. The recess in the inner surface of the skin layer and the protrusion of the substrate may be configured to facilitate deployment of the airbag through the opening by facilitating formation of the opening through the skin layer. The recess may be formed as an indentation in the inner surface of the skin layer. The recess may comprise a notch. The protrusion of the substrate may be in the recess of the skin layer. The protrusion of the substrate may penetrate the inner surface of the skin layer to form the recess of the skin layer. The protrusion may comprise an angled surface. The skin layer may be molded on the substrate. The recess may be formed by molding the skin layer on the protrusion of the substrate. The skin layer may comprise an injection molded thermoplastic material. The skin layer may comprise a generally opaque material. The skin layer may comprise at least one of (a) a TPE material; (b) a TPV material; (c) a PU material. The skin layer may comprise a skin material; the substrate may comprise an injection-molded material; the skin material may be softer than the composite material. The skin layer may be configured to provide an exterior surface of the component. The skin layer may comprise an outer surface opposite the inner surface of the skin layer; the outer surface may comprise a substantially planar surface opposite the recess in the inner surface of the skin layer. A rear side of the substrate may be configured for contact from the airbag to establish the opening for deployment of the airbag.

The rear side of the substrate may be configured to support an airbag module comprising the airbag. The substrate may comprise a recess RS at the rear side of the substrate adjacent the recess of the skin layer. The recess of the substrate may be configured to facilitate deployment of the airbag through the opening by facilitating formation of the opening through the skin layer. The skin layer may comprise a thermoplastic material; the substrate may comprise an injection-molded material; the substrate may comprise at least one feature at the rear side of the substrate formed from the thermoplastic material of the skin layer. The component may comprise at least one of (a) an instrument panel; (b) a dashboard; (c) a door panel; (d) a steering wheel assembly; (e) a console; (f) a cockpit; (g) a knee bolster; (h) a trim component.

Figures 40A, 40B:
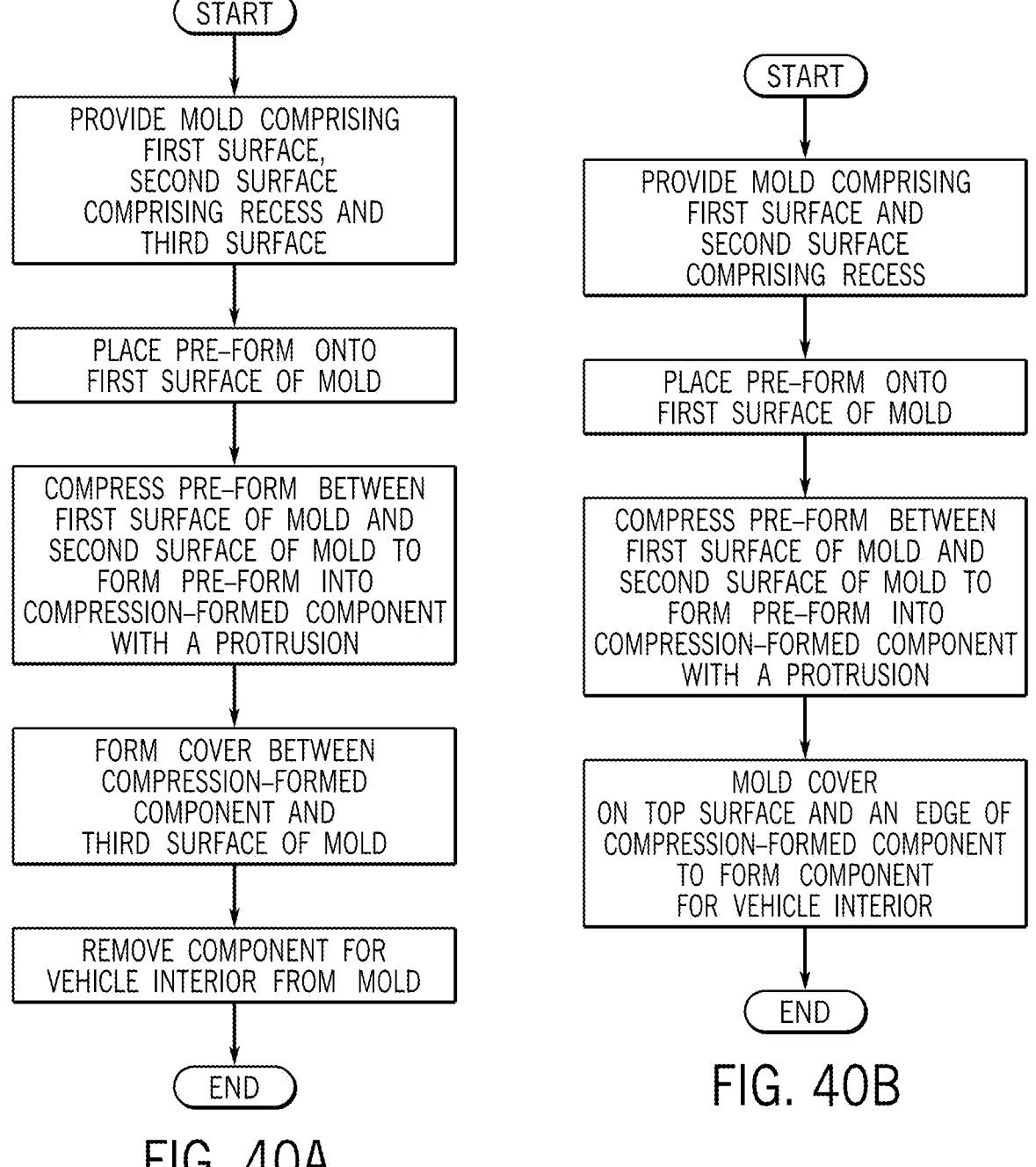
FIGS. 40A and 40B are schematic flow diagrams of forming a component for a vehicle interior according to an exemplary embodiment.

According to an exemplary embodiment as shown schematically in FIG. 40A, a method of manufacturing a component C for a vehicle interior configured to provide an opening for deployment of an airbag AB through the opening in a mold may comprise providing a mold comprising a first surface, a second surface comprising a depression and a third surface; placing a pre-form onto the first surface of the mold; compressing the pre-form between the first surface of mold and the second surface of mold to form the pre-form into a compression-formed component with a protrusion; molding a cover between the compression-formed component and the third surface of mold; and removing the component for vehicle interior from the mold.

According to an exemplary embodiment as shown schematically in FIG. 40B, a method of manufacturing a component C for a vehicle interior configured to provide an opening for deployment of an airbag AB through the opening in a mold may comprise providing a mold comprising a first surface and a second surface comprising a depression; placing a pre-form onto the first surface of the mold; compressing the pre-form between the first surface of mold and the second surface of the mold to form the pre-form into a compression-formed component with a protrusion; and molding a cover on a top surface and on an edge of the compression-formed component to form the component for the vehicle interior.

TABLE A

REFERENCE SYMBOL LIST

| ELEMENT, PART OR COMPONENT | REFERENCE SYMBOL |
| --- | --- |
| vehicle | V |
| interior | I |
| component | C |
| door/door panel | DL |
| instrument panel | IP |
| steering wheel | SW |
| airbag exit area | ABX |
| tear line/seam | TR |
| feature | FT |
| airbag door | ABD |
| airbag | AB |
| cover | T |
| housing/structure (airbag chute) | CH |
| compression-formed panel | CF |
| substrate/panel | SB |
| projection/protrusion on substrate | PN |
| rib/ridge | RB |
| nub | NB |
| base layer of substrate | BL |
| hinge | HG |
| fiber mat | FM |
| pre-form | PF |

TABLE A-continued

REFERENCE SYMBOL LIST

| ELEMENT, PART OR COMPONENT | REFERENCE SYMBOL |
| --- | --- |
| oven | VN |
| mold bottom | MB |
| mold top | MT MTx |
| surface | NS |
| surface | PB |
| smooth surface | SM |
| recess | RS |
| exterior surface of cover | TX |
| injection molded substrate/panel | PL |
| nominal thickness of mat/fiber mad | tM |
| nominal thickness of pre-form/preform panel | tP |
| nominal residual thickness of cover (at recess) | tR |
| nominal thickness of cover | tT |

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/ operations described in the specification and/or illustrated in the FIGURES. All such technology (e.g. as implemented in embodiments, modifications, variations, combinations, equivalents, etc.) is considered to be within the scope of the present inventions of the present patent document.

The invention claimed is:

1. A component for an interior of a vehicle configured to facilitate formation of an opening for deployment of an airbag into the interior of the vehicle comprising:

a composite structure comprising a substrate and a cover;
wherein the substrate comprises a base layer and a feature configured to facilitate formation of the opening through the cover;
wherein the cover comprises a cover layer;
wherein the cover is provided over the substrate;
wherein the base layer of the substrate comprises a fiber panel formed into a compressed fiber panel;
wherein the substrate comprises a structural substrate comprising the compressed fiber panel;
wherein the feature of the substrate comprises a projection arrangement for the structural substrate;
wherein the projection arrangement comprises a set of projections formed of resin molded on the compressed fiber panel;
wherein the projection arrangement is configured to provide a tear line for formation of the opening;
wherein the projection arrangement comprises the set of projections and a set of connectors.

2. The component of claim 1 wherein at least one projection of the projection arrangement is configured to initiate formation of the opening.

3. The component of claim 1 wherein the cover is molded onto the substrate.

4. The component of claim 1 wherein the set of projections is integrally formed with the base layer.

5. The component of claim 1 wherein the set of projections is configured to project from the base layer into the cover; wherein the cover comprises a set of cavities aligned with the set of projections.

6. The component of claim 1 wherein the tear line comprises a center segment configured to initiate the opening and a set of lateral segments configured to complete the opening.

7. The component of claim 1 wherein the projection arrangement comprises a pattern of projections; wherein the set of projections comprises a set of nubs; wherein the pattern of projections comprises the set of nubs and a set of connectors.

8. The component of claim 1 wherein the compressed fiber panel comprising the base layer of the substrate comprises a generally rigid fiber panel.

9. The component of claim 1 wherein the cover layer comprises a recess at an inner surface in alignment with the projection arrangement of the structural substrate; wherein the recess comprises an indentation at the inner surface of the cover layer.

10. The component of claim 9 wherein the substrate comprises at least one feature formed adjacent the recess.

11. The component of claim 1 wherein the cover layer comprises an outer surface comprising a substantially uniform exterior surface for the cover.

12. A component for a vehicle interior configured to facilitate deployment of an airbag comprising:

(a) a substrate comprising a fiber panel configured to be formed into a structural substrate; and
(b) a cover comprising a cover layer provided on the substrate;
wherein the structural substrate comprises a projection arrangement;
wherein the cover layer comprises a recess at an inner surface in alignment with the projection arrangement of the structural substrate;
wherein the recess at the inner surface of the cover layer and the projection arrangement of the structural substrate are formed to facilitate deployment of the airbag by facilitating formation of an opening through the cover layer;
wherein the projection arrangement of the structural substrate comprises a set of nubs;
wherein the projection arrangement comprises a pattern of projections;
wherein the pattern of projections comprises the set of nubs and a set of connectors for the set of nubs.

13. The component of claim 12 wherein the cover layer comprises a molded skin layer; wherein the recess is formed as an indentation in the inner surface of the molded skin layer.

14. The component of claim 12 wherein the cover layer comprises an outer surface opposite the inner surface of the cover layer; wherein the outer surface comprises a substantially uniform exterior surface for the cover.

15. The component of claim 12 wherein the cover layer comprises a skin material; wherein the substrate comprises a composite material; wherein the skin material is softer than the composite material.

16. The component of claim 12 formed by a method comprising the steps of:

(a) forming the structural substrate as a compression-formed fiber panel from the substrate by compression of the fiber panel in a mold tool;
(b) molding the cover as the cover layer on the fiber panel formed into the structural substrate;
wherein the structural substrate comprises the projection arrangement;
wherein an inner surface of the cover layer comprises the recess formed by molding the skin layer on the projection arrangement of the structural substrate;
wherein the step of molding the cover as the cover layer on the substrate comprises injection molding of a thermoplastic material on the substrate.

17. A component for an interior of a vehicle configured to facilitate formation of an opening for deployment of an airbag into the interior of the vehicle comprising:

a composite structure comprising a substrate and a cover;
wherein the substrate comprises a base layer and a feature configured to facilitate formation of the opening through the cover;
wherein the cover comprises a cover layer;
wherein the cover is provided over the substrate;
wherein the base layer of the substrate comprises a fiber panel formed into a compressed fiber panel;
wherein the substrate comprises a structural substrate comprising the compressed fiber panel;
wherein the feature of the substrate comprises a projection arrangement for the structural substrate;
wherein the projection arrangement comprises a set of projections and a set of connectors;

wherein the projection arrangement is configured to provide a tear line for formation of the opening.

18. The component of claim 17 wherein the set of projections comprises a set of nubs formed of a resin on the compressed fiber panel.

19. The component of claim 18 wherein the projection arrangement comprises the set of nubs and a set of connectors between the set of nubs.

20. The component of claim 17 wherein the cover layer comprises an outer surface comprising a substantially uniform exterior surface for the cover.

\* \* \* \* \*